US009258019B2

(12) United States Patent
Dokai et al.

(10) Patent No.: US 9,258,019 B2
(45) Date of Patent: Feb. 9, 2016

(54) COMMUNICATION DEVICE

(71) Applicant: Murata Manufacturing Co., Ltd., Nagaokakyo-shi, Kyoto-fu (JP)

(72) Inventors: Yuya Dokai, Nagaokakyo (JP); Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/291,203

(22) Filed: May 30, 2014

(65) Prior Publication Data
US 2014/0273899 A1 Sep. 18, 2014

Related U.S. Application Data

(63) Continuation of application No. PCT/JP2013/053018, filed on Feb. 8, 2013.

(30) Foreign Application Priority Data

Apr. 18, 2012 (JP) ................................. 2012-094794
May 28, 2012 (JP) ................................. 2012-120456
Jul. 11, 2012 (JP) ................................. 2012-155748
Oct. 4, 2012 (JP) ................................. 2012-222546

(51) Int. Cl.
*H04B 1/10* (2006.01)
*H04B 1/00* (2006.01)
*H04B 1/525* (2015.01)
*H04B 15/04* (2006.01)
(Continued)

(52) U.S. Cl.
CPC ............ *H04B 1/0078* (2013.01); *H04B 1/0458* (2013.01); *H04B 1/18* (2013.01); *H04B 1/3805* (2013.01); *H04B 1/525* (2013.01); *H04B 15/04* (2013.01)

(58) Field of Classification Search
CPC ........ H04B 1/10; H04B 1/1036; H04B 15/00; H04B 15/04; H04B 15/06
USPC ..................... 455/127.4, 295, 310, 317, 552.1
See application file for complete search history.

(56) References Cited

U.S. PATENT DOCUMENTS

2006/0293097 A1 12/2006 Shimizu et al.
2007/0120678 A1 5/2007 Posamentier
(Continued)

FOREIGN PATENT DOCUMENTS

CN 102379063 A 3/2012
JP 11-31905 A 2/1999
(Continued)

OTHER PUBLICATIONS

Official Communication issued in International Patent Application No. PCT/JP2013/053018, mailed on Mar. 5, 2013.
(Continued)

*Primary Examiner* — Lee Nguyen
(74) *Attorney, Agent, or Firm* — Keating & Bennett, LLP

(57) ABSTRACT

An RFID device provided at a transmission and reception circuit processes an RFID carrier signal belonging to a band of about 902 MHz to about 928 MHz or about 865 MHz to about 868 MHz to execute near field radio communication. An RFIC provided at a transmission and reception circuit processes a GSM carrier signal belonging to a band of about 824 MHz to about 894 MHz or about 880 MHz to about 960 MHz to execute mobile communication. A filter circuit provided at the transmission and reception circuit takes the band of about 850 MHz to about 940 MHz where RFID carrier signals appear as the pass band, and takes the band greater than or equal to about 1.2 GHz where a harmonic wave component of GSM carrier signals appears as the attenuation band.

13 Claims, 23 Drawing Sheets

(51) Int. Cl.
*H04B 1/04* (2006.01)
*H04B 1/18* (2006.01)
*H04B 1/3805* (2015.01)
*H04B 1/26* (2006.01)

(56) References Cited

U.S. PATENT DOCUMENTS

| | | |
|---|---|---|
| 2009/0021446 A1 | 1/2009 | Kataya et al. |
| 2011/0018773 A1 | 1/2011 | Hikino |
| 2012/0086609 A1 | 4/2012 | Kikuchi et al. |
| 2014/0073268 A1 | 3/2014 | Taniuchi et al. |

FOREIGN PATENT DOCUMENTS

| | | |
|---|---|---|
| JP | 2005-244286 A | 9/2005 |
| JP | 2006-121211 A | 5/2006 |
| JP | 2008-294635 A | 12/2008 |
| JP | 2009-153166 A | 7/2009 |
| WO | 2005/086363 A1 | 9/2005 |
| WO | 2009/011154 A1 | 1/2009 |
| WO | 2009/154053 A1 | 12/2009 |
| WO | 2011/067942 A1 | 6/2011 |
| WO | 2013/157288 A1 | 10/2013 |

OTHER PUBLICATIONS

Official Communication issued in Japanese Patent Application No. 2013-525066, mailed on Jul. 23, 2013.

Official Communication issued in corresponding U.K. Patent Application No. GB1410943.3, mailed on Jul. 30, 2014.

Official Communication issued in corresponding Japanese Patent Application No. 2013-189090, mailed on Aug. 11, 2015.

FIG.6
(A)
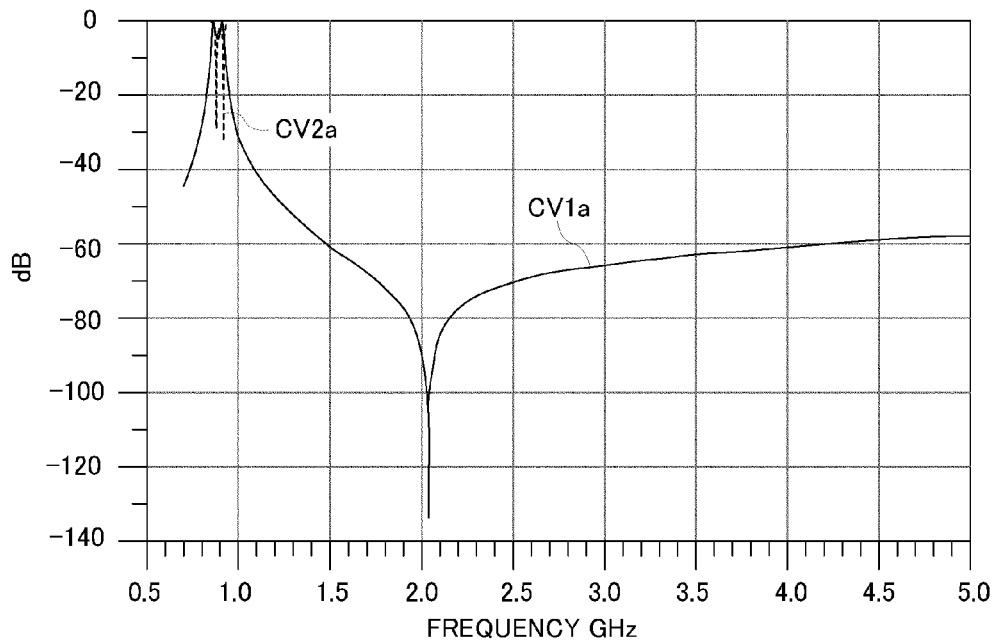
(B)
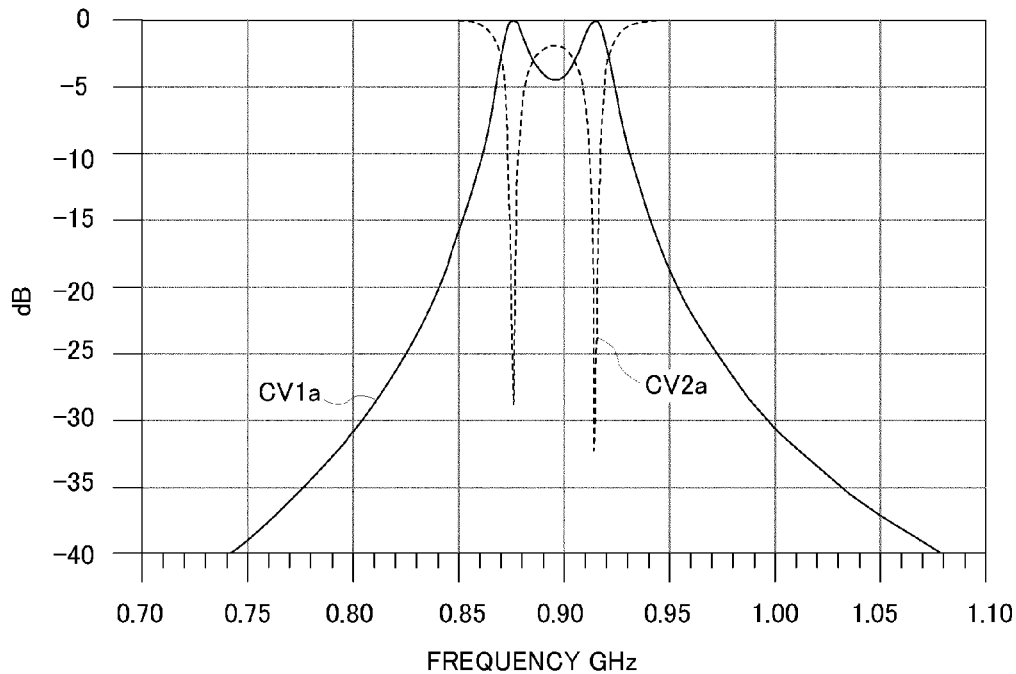

FIG.8
(A)
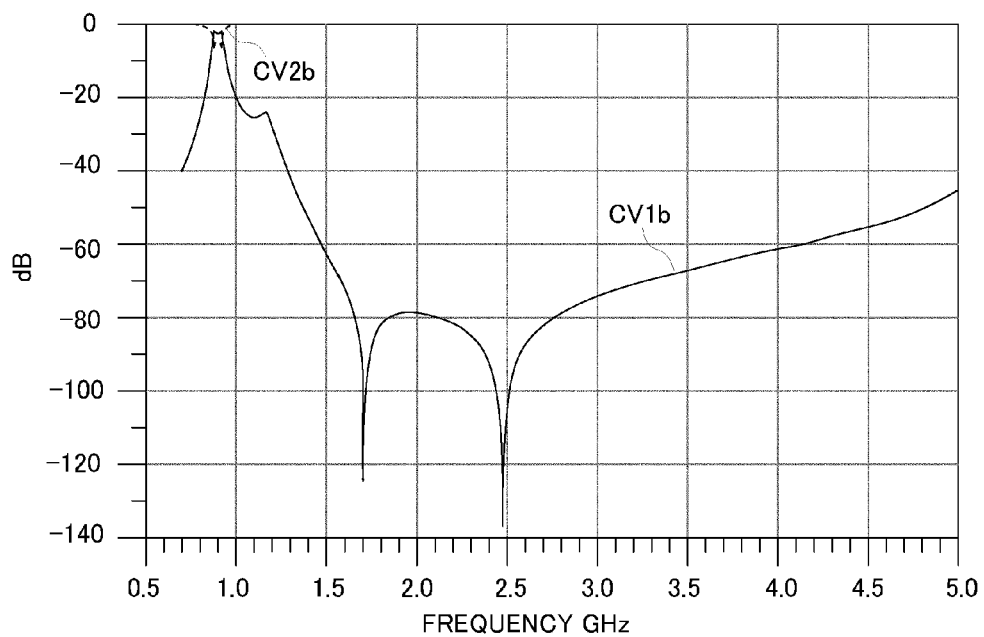
(B)
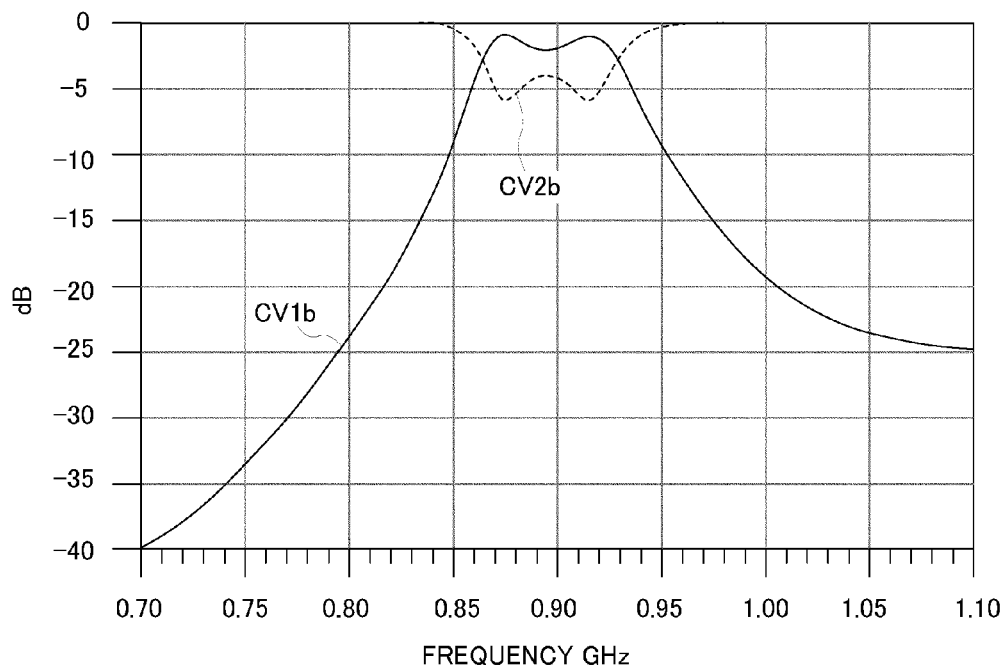

FIG.10
(A)
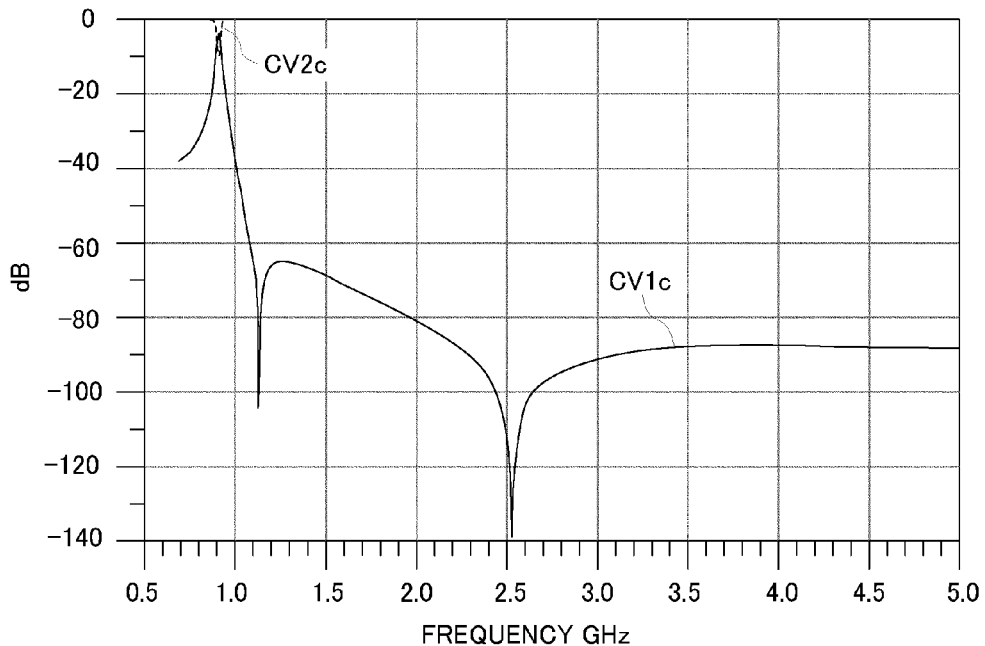
(B)
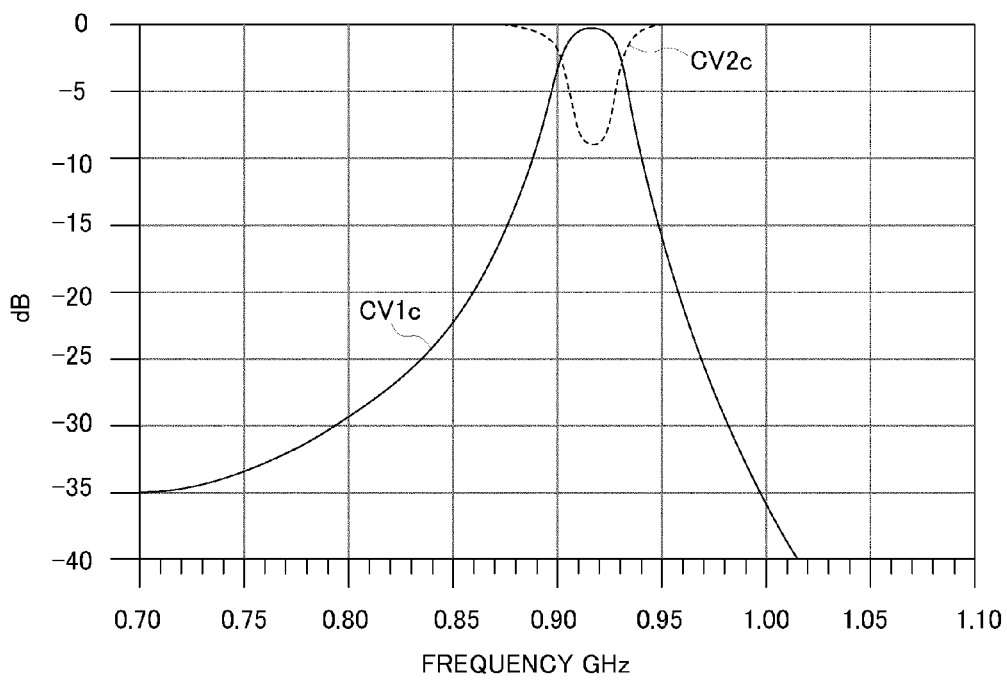

COMMUNICATION DEVICE

BACKGROUND OF THE INVENTION

1. Field of the Invention

The present invention relates to a communication device including a plurality of communication systems, particularly a communication device including a plurality of communication systems utilizing an UHF band.

2. Description of the Related Art

An example of a radio device used in a RFID (Radio Frequency Identification) system is disclosed in WO 2009/011154. According to the background art, a radio IC chip processing transmission and reception signals for RFID is mounted on a printed circuit board. The printed circuit board also includes a ground electrode and a loop electrode. The loop electrode is electrically conducted with the radio IC chip, and is connected with the ground electrode by electromagnetic coupling or directly in a DC-connected manner. The radio frequency signal received by the ground electrode is input to the radio IC chip through the loop electrode, whereas the radio frequency signal output from the radio IC chip is emitted outside from the ground electrode through the loop electrode. In other words, the ground electrode functions as a radiating element in the RFID system.

However, in the case where a radio communication system transmitting and receiving another radio frequency signal such as a GSM (Global System for Mobile Communications: registered trademark) system is additionally mounted on the printed circuit board, particularly in the case where the frequency band corresponding to each of different radio communication systems such as the RFID system and the GSM system is in common, the radio frequency signal of high intensity transmitted by the radio communication system will be distorted by the radio IC chip for the RFID system, and the harmonic wave component generated thereby may be emitted from the ground electrode or the antenna element for the GSM system as a spurious response.

In other words, in a communication system mounted with a first radio communication system such as the RFID system and also a second radio communication system such as the GSM system, the communication performance will be degraded by the generation of the aforementioned harmonic wave component and radiation thereof.

SUMMARY OF THE INVENTION

In view of the foregoing, preferred embodiments of the present invention provide a communication device capable of, even when a plurality of communication systems are incorporated, sufficiently exhibiting communication performance of each system.

A communication device according to a preferred embodiment of the present invention includes a first communication system configured to communicate using a first communication signal with a first frequency band as a carrier frequency, and including a first radio communication integrated circuit configured to process the first communication signal; and a second communication system configured to communicate using a second communication signal with a second frequency band as the carrier frequency, and including a second radio communication integrated circuit configured to process the second communication signal. The first communication system further includes a filter circuit including a first frequency band as a pass band, and configured to attenuate the second communication signal or a harmonic wave component thereof.

Preferably, the second frequency band is in the vicinity of the first frequency band or in the vicinity of the harmonic wave of the first frequency band.

Preferably, the first communication system further includes a first radiator connected to the first radio communication integrated circuit and configured to radiate a first communication signal, and the second communication system further includes a second radiator connected to the second radio communication integrated circuit and configured to radiate a second communication signal.

More preferably, the first radiator is equivalent to a ground electrode provided in a device frame.

Further preferably, the second communication system is electrically connected to the ground electrode.

According to a preferred embodiment of the present invention, the first and second communication systems are connected with a common ground electrode at different feeding points. The filter circuit is provided between the feeding point of the ground electrode and the first radio communication integrated circuit.

Preferably, the first radio communication integrated circuit and the first radiator are connected by two signal lines parallel to each other.

According to a preferred embodiment of the present invention, the filter circuit preferably includes two filter elements assigned to two signals lines, respectively.

According to another preferred embodiment of the present invention, the two signal lines preferably are equivalent to a differential path. The filter circuit preferably is equivalent to a balance filter circuit.

According to a further preferred embodiment of the present invention, the filter circuit preferably includes an inductor and a capacitor connected in series between the two signal lines.

Preferably, the first communication system further includes a band broadening circuit configured to broaden the pass band width of the filter circuit.

Preferably, the first communication system further includes a substrate on which the first radio communication integrated circuit is mounted. The substrate preferably includes a stack of a plurality of base layers and a plurality of conductor layers. The filter circuit preferably includes conductor layers, and is incorporated within the substrate.

Preferably, the first communication system is an RFID system using a 900 MHz band as the first frequency band, whereas the second communication system is a GSM system using an 850 MHz band or 900 MHz band as the second frequency band, for example.

Preferably, a radio communication device is the communication device described above, and includes a first radio communication integrated circuit, and a substrate including the first radio communication integrated circuit mounted thereon, and incorporating the filter circuit inside.

Although an input of a second communication signal used in a second communication system to a first radio communication integrated circuit of a first communication system may cause distortion of the second communication signal to degrade the communication property of the second communication signal, the above-described filter circuit is provided at the first communication system. Accordingly, the communication property of the second communication system is prevented from being disturbed greatly by the first communication system. Although a harmonic wave component of the second communication system may be generated at the first radio communication integrated circuit when the first frequency band and the second frequency band are close to each other, the generated harmonic wave component is attenuated by the filter circuit provided at an input/output end of the first radio communication integrated circuit. Accordingly, emission of a harmonic wave component of the second communication system is significantly reduced or prevented. Furthermore, since the filter circuit takes the first frequency band to which the first communication signal belongs as the pass band, the filter circuit will not greatly disturb the communication performance of the first communication system. Accordingly, the communication performance of each of a plurality of communication systems, even when integrated together, is exhibited sufficiently.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a graph representing an example of frequency characteristics of the power feeding circuit shown in FIG. 5, and FIG. 6B is an enlarged view of the main portion of the graph of FIG. 6A.

FIG. 8A is a graph representing an example of frequency characteristics of the power feeding circuit shown in FIG. 7, and FIG. 8B is an enlarged view of the main portion of the graph of FIG. 8A.

FIG. 10A is a graph representing an example of frequency characteristics of the power feeding circuit shown in FIG. 9, and FIG. 10B is an enlarged view of the main portion of the graph of FIG. 10A.

DETAILED DESCRIPTION OF THE PREFERRED EMBODIMENTS

Preferred embodiments of the present invention will be described hereinafter with reference to the drawings.

Figure 1:
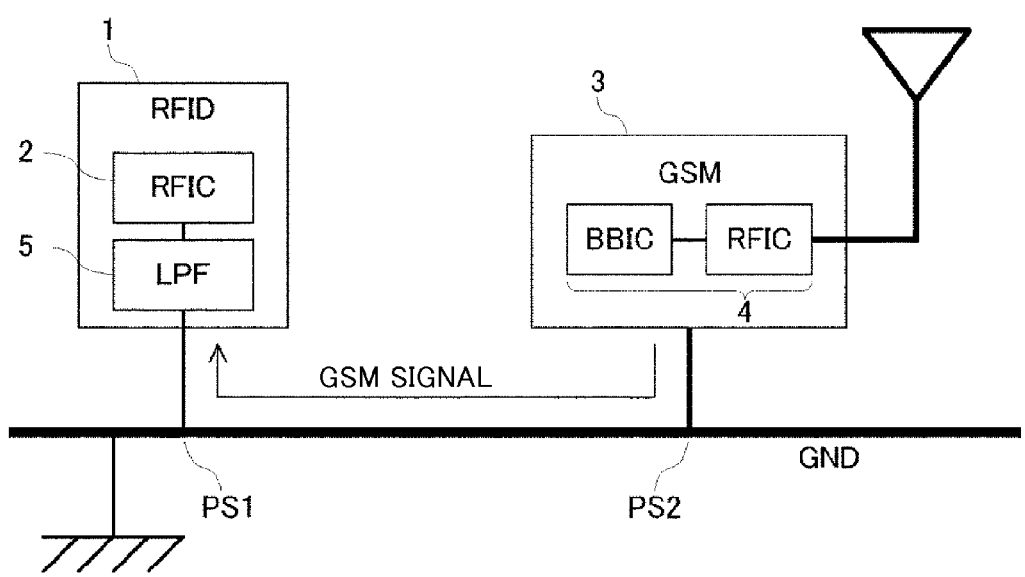
FIG. 1 is a block diagram representing a basic configuration of a preferred embodiment of the present invention.

Referring to FIG. 1, a communication device of the present preferred embodiment preferably is a mobile communication terminal device including an UHF band RFID system and an UHF band GSM system, and preferably is basically configured as set forth below. UHF band RFID system 1 communicates using a first communication signal with the UHF band as the carrier frequency, and includes an integrated circuit 2 for radio communication, processing the first communication signal. At RFID system 1, integrated circuit 2 is connected to a first feeding point PS1 of a ground electrode GND provided on or at a printed circuit board or the like. This ground electrode GND is used as a radiating element of RFID system 1. UHF band GSM system 3 communicates using a second communication signal with the UHF band as the carrier frequency, and includes an integrated circuit 4 for radio communication, processing the second communication signal. In GSM system 3, integrated circuit 4 includes an RF unit and a BB unit. The RF unit is a block mainly serving to switch between a transmission signal and a reception signal. The BB unit mainly serves to modulate/demodulate a transmission/reception signal. Integrated circuit 4 is connected to an antenna ANT and a second feeding point PS2 of ground electrode GND, taking the so-called frame dipole type antenna configuration utilizing antenna ANT and ground electrode GND as radiating elements. UHF band RFID system 1 further includes an LPF 5 with the UHF band as the pass band, and attenuating the harmonic wave component of the second communication signal. Although first feeding point PS1 and second feeding point PS2 are provided on the same ground electrode GND, their locations differ.

Although input of a second communication signal used in UHF band GSM system 3 to integrated circuit 2 of UHF band RFID system 1 may cause generation of a harmonic wave component of the second communication signal at integrated circuit 2, the generated harmonic wave component is attenuated at LPF 5 provided at the input/output end of integrated circuit 2. Accordingly, output of a harmonic wave component of the second communication system from RFID system 1 is significantly reduced or prevented, which in turn prevents the harmonic wave component of the second communication system from being radiated from antenna ANT or from ground electrode GND, or from adversely affecting the GSM system or another system.

Since LPF 5 takes the UHF band to which the first communication signal belongs as the pass band, LPF 5 will not greatly disturb the communication performance of UHF band RFID system 1. Accordingly, the communication performance of each of a plurality of communication systems, even when integrated, is exhibited sufficiently.

First Preferred Embodiment

Figure 2:
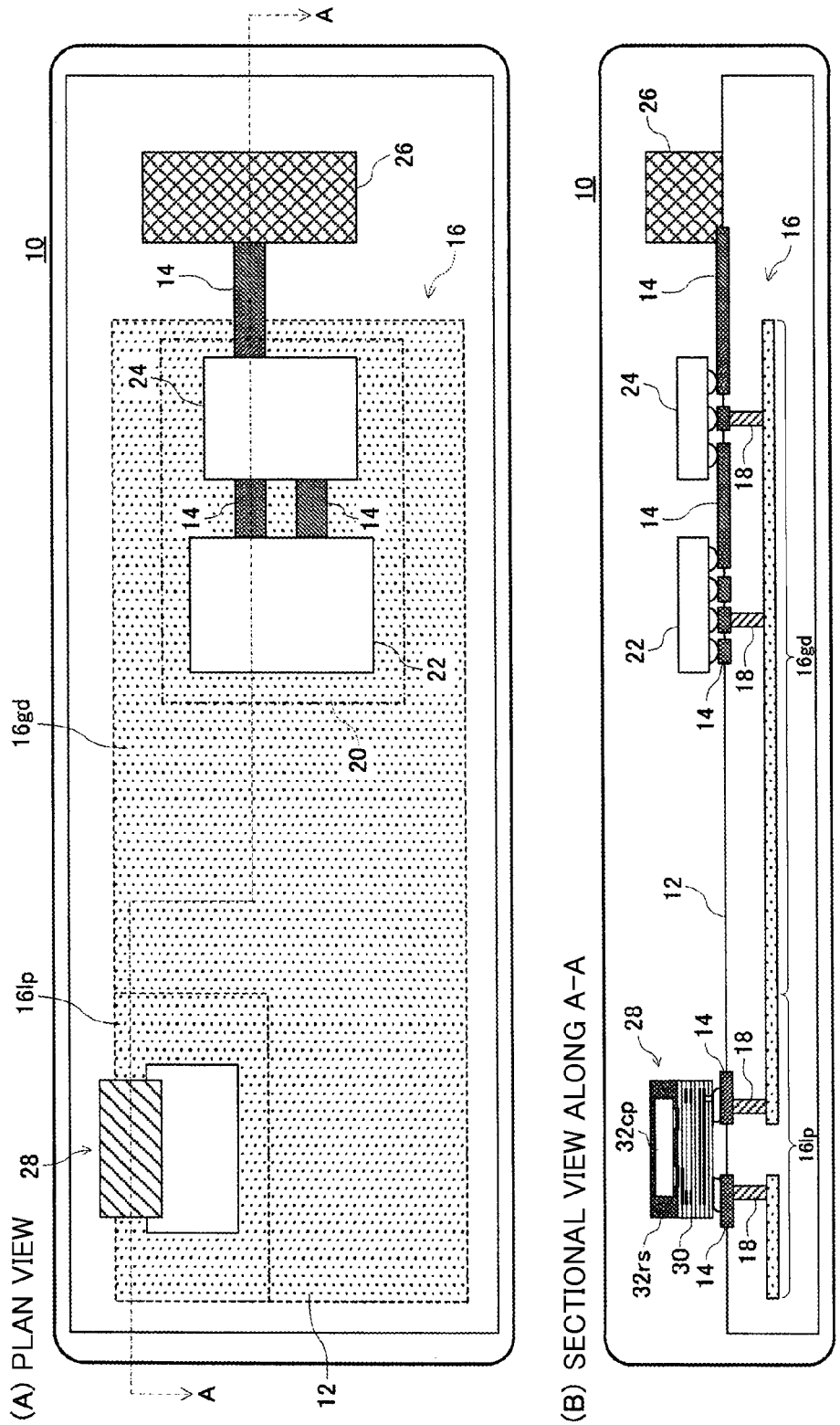
FIG. 2A represents a plan view of an example of a communication device according to a preferred embodiment of the present invention and FIG. 2B is a sectional view taken along A-A of the communication device in FIG. 2A.

Referring to FIGS. 2A and 2B, communication device 10 of the present preferred embodiment includes a printed circuit board 12 including a main surface that is preferably rectangular or substantially rectangular. Printed circuit board 12 is arranged in a terminal frame of communication device 10. A conductive wiring 14 is provided at one main surface of printed circuit board 12. A flat electrode 16 is embedded in printed circuit board 12. Wiring 14 and flat electrode 16 are connected with each other by a plurality of via hole conductors 18. Flat electrode 16 functions as a ground electrode of each type of functional unit incorporated in the communication device such as the manipulation unit, display unit, power supply unit, and the like.

The one main surface of printed circuit board 12 is also mounted with a transmission and reception block for a mobile communication system conformed to the GSM 850 standard for countries in North America and the GSM 900 standard for countries in Europe, and an antenna 26, as well as a device for near field radio communication conformed to the UHF band RFID standard (hereinafter, referred to as "RFID device") 28. Transmission and reception block 20 preferably includes a BBIC (Base Band Integrated Circuit) chip 22 configured to process a frequency signal belonging to a base band, and a front end module 24 configured to process a frequency signal belonging to the UHF band. Front end module 24 is preferably provided as a module component including a switching IC configured to switch between a transmission path and reception path and a filter circuit such as a SAW filter integrated. RFID device 28 preferably includes a power feeding circuit substrate 30, and a radio IC chip 32cp for RFID mounted on power feeding circuit substrate 30 in a state sealed by resin 32rs.

Specifically, in the present preferred embodiment, the first communication system using a first communication signal with the UHF band that is the first frequency band as the carrier frequency is the UHF band RFID system, whereas the second communication system using a second communication signal with the UHF band that is the second frequency band as the carrier frequency is the UHF band GSM system. The integrated circuit for the UHF band RFID system that is the first radio communication integrated circuit is preferably provided as an RFIC chip 32cp, whereas the integrated circuit for the GSM system that is the second radio communication integrated circuit is preferably provided as BBIC chip 22 and front end module 24. RFIC chip 32cp includes a logic circuit, a memory circuit, and the like to process the communication signal of each RFID system such as modulating/demodulating a communication signal.

BBIC chip 22 is mounted on printed circuit board 12 preferably utilizing a solder bump formed in advance, for example. Front end module 24, antenna element 26, and RFID device 28 are mounted on printed circuit board 12 using solder paste, for example.

Figure 3:
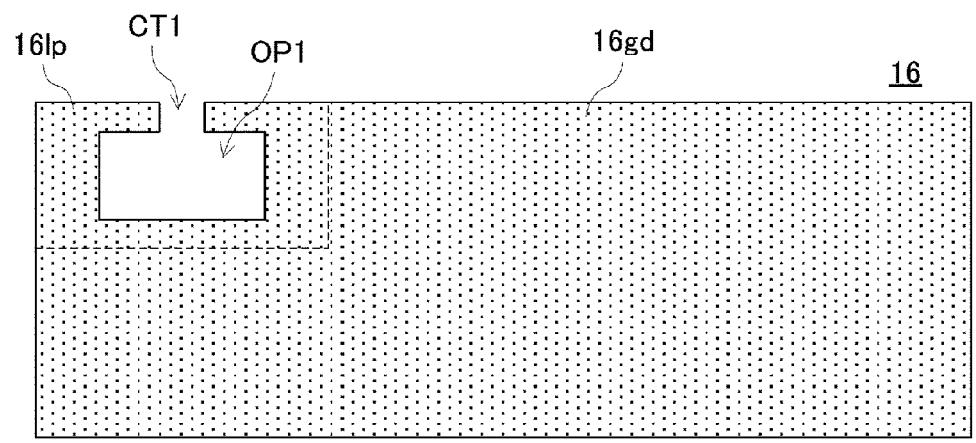
FIG. 3 is a plan view representing an example of a flat electrode applied to the preferred embodiment shown in FIGS. 2A and 2B.

Referring to FIG. 3, the contour of the main surface of flat electrode 16 preferably is rectangular or substantially rectangular, excluding a notch CT1 provided at the upper left region of the main surface. In the proximity of notch CT1, a rectangular or substantially rectangular through hole OP1 passing through from one main surface to the other main surface of flat electrode 16 is provided. The long side and short side of the rectangle constituting through hole OP1 extend parallel or substantially parallel to the long side and short side of the rectangle corresponding to the contour of the main surface of flat electrode 16. Notch CT1 reaches through hole OP1. Through hole OP1 communicates externally via notch CT1. Through hole OP1 and notch CT1 may also be referred to as "opening" and "slit", respectively. Although the opening and slit preferably are formed such that the width of the opening is preferably greater than the width of the slit, the opening and slit may have the same width, for example.

Hereinafter, a portion of flat electrode 16 around through hole OP1 is defined "loop electrode 16*lp*", whereas the other portion of flat electrode 16 in contact with loop electrode 16*lp* is defined as "ground electrode 16*gd*".

Returning to FIGS. 2A and 2B, the area of the main surface of flat electrode 16 preferably is equal or substantially equal to the area of the main surface of printed circuit board 12. The thickness of flat electrode 16 is drastically smaller than the thickness of printed circuit board 12. Flat electrode 16 is embedded in printed circuit board 12 in a manner in which the main surface of flat electrode 16 spreads parallel or substantially parallel to the main surface of printed circuit board 12, and the long and short sides of the rectangle constituting the contour of the main surface of flat electrode 16 extend parallel or substantially parallel to the long and short sides of the rectangle constituting the main surface of printed circuit board 12.

The two ends of loop electrode 16lp defined by notch CT1 are connected to two wirings 14, 14 on printed circuit board 12 through two via hole conductors 18, 18. These wirings 14 also serve as a land pattern. Two connection terminals of power feeding circuit substrate 30 are mounted in a manner connected with these two wirings 14, 14. Therefore, RFIC chip 32cp is electrically connected with ground electrode 16gd via power feeding circuit 30psc (refer to FIG. 5), wiring 14, via hole conductor 18 and loop electrode 16lp provided at power feeding circuit substrate 30. Loop electrode 16lp functions as a portion of a rectifier circuit to cause impedance matching between RFID device 28 and ground electrode 16gd (band broadening circuit 30w constituting power feeding circuit 30psc shown in FIG. 5).

Figure 4:
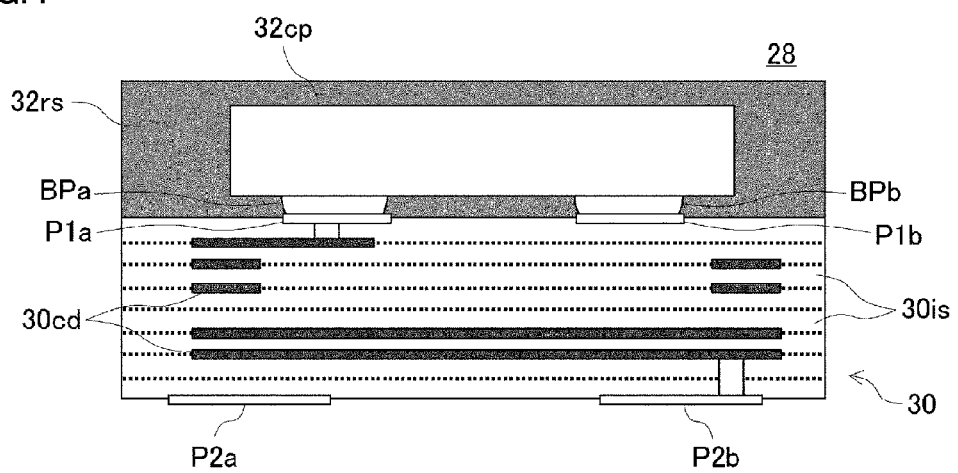
FIG. 4 is a sectional view representing an example of a layered state of a transmission and reception circuit applied to the preferred embodiment shown in FIGS. 2A and 2B.

The configuration of RFID device 28 is shown in FIG. 4. Power feeding circuit substrate 30 is configured to constitute a cuboid including a plurality of base layers 30is and a plurality of conductor layers 30cd stacked alternately. Power feeding circuit substrate 30 includes power feeding circuit 30psc shown in FIG. 5 incorporated by the conductor layers and intermediate connection conductors. At the bottom surface of power feeding circuit substrate 30, connection terminals P2a and P2b qualified as electrodes to mount on printed circuit board 12 are provided. At the top surface of power feeding circuit substrate 30, connection terminals P1a and P1b qualified as electrodes for the mounting of RFIC chip 32cp are provided. Loop electrode 16lp includes one end connected to connection terminal P2a and the other end connected to connection terminal P2b. Base layer 30 configuring power feeding circuit substrate 30 is preferably made of a low temperature sintered ceramic layer or a resin layer such as of thermoplastic resin or thermosetting resin. Conductor layer 30cd and the interlayer connection conductor are preferably made of a metal material or the like having small resistivity with silver or copper as the main component.

RFIC chip 32cp is preferably provided as a bare chip IC or a package IC, mounted on power feeding circuit substrate 30 and sealed by resin 32rs such as thermosetting resin or the like. At the bottom surface of RFIC chip 32cp, two input/output terminals (not shown) are provided. One input/output terminal is connected, via a bump BPa, to connection terminal P1a provided at the top face of power feeding circuit substrate 30. The other input/output terminal is connected, via a bump BPb, to connection terminal P1b provided at the top surface of power feeding circuit substrate 30. These two input/output terminals constitute a balance type terminal.

According to the GSM 850 standard, the frequency band of 824 MHz-849 MHz is assigned for transmission, whereas the frequency band of 869 MHz-894 MHz is assigned for reception. According to the GSM 900 standard, the frequency band of 880 MHz-915 MHz is assigned for transmission whereas the frequency band of 925 MHz-960 MHz is assigned for reception. Accordingly, RFID device 28 uses the frequency band of 902 MHz-928 MHz corresponding to the GMS 850 standard, and uses the frequency band of 865 MHz-868 MHz corresponding to the GMS 900 standard.

Thus, GSM system BBIC chip 22 and front end module 24 provided at transmission and reception block 20 process GSM system communication signals belonging to the bands of 824 MHz-849 MHz and 869 MHz-894 MHz, or the bands of 880 MHz-915 MHz and 925 MHz-960 MHz to execute mobile communication. RFIC chip 32cp for the RFID system provided at RFID device 28 processes RFID system communication signals belonging to the band of 902 MHz-928 MHz or 865 MHz-868 MHz to execute near field radio communication.

The GSM system communication signals are transmitted/received through antenna 26, and transmitted/received through ground electrode 16gd. In other words, the GSM system of the present preferred embodiment utilizes the frame current (ground current) for communication signal transmission/reception. Communication signals for the RFID system communication signals are transmitted/received through loop electrode 16lp and ground electrode 16gd. In other words, the RFID system of the present preferred embodiment uses the frame current (ground current) for communication signal transmission/reception. Thus, ground electrode 16gd can be defined as "radiator" for both systems since the communication signals for both the GSM system and the RFID system are emitted outwards via ground electrode 16gd.

The frequency of RFID system communication signals is set in the vicinity of the frequency of GSM system communication signals. Therefore, when a GSM system communication signal corresponding to a relatively large transmitting electric power of several watts enters RFID device 28, distortion thereof causes a harmonic wave component that is the second order harmonic, third order harmonic, etc., of the GSM communication signal to be generated at RFIC chip 32cp for RFID. This harmonic wave component is radiated as a spurious, leading to the possibility of degrading the GSM system communication property.

Figure 5:
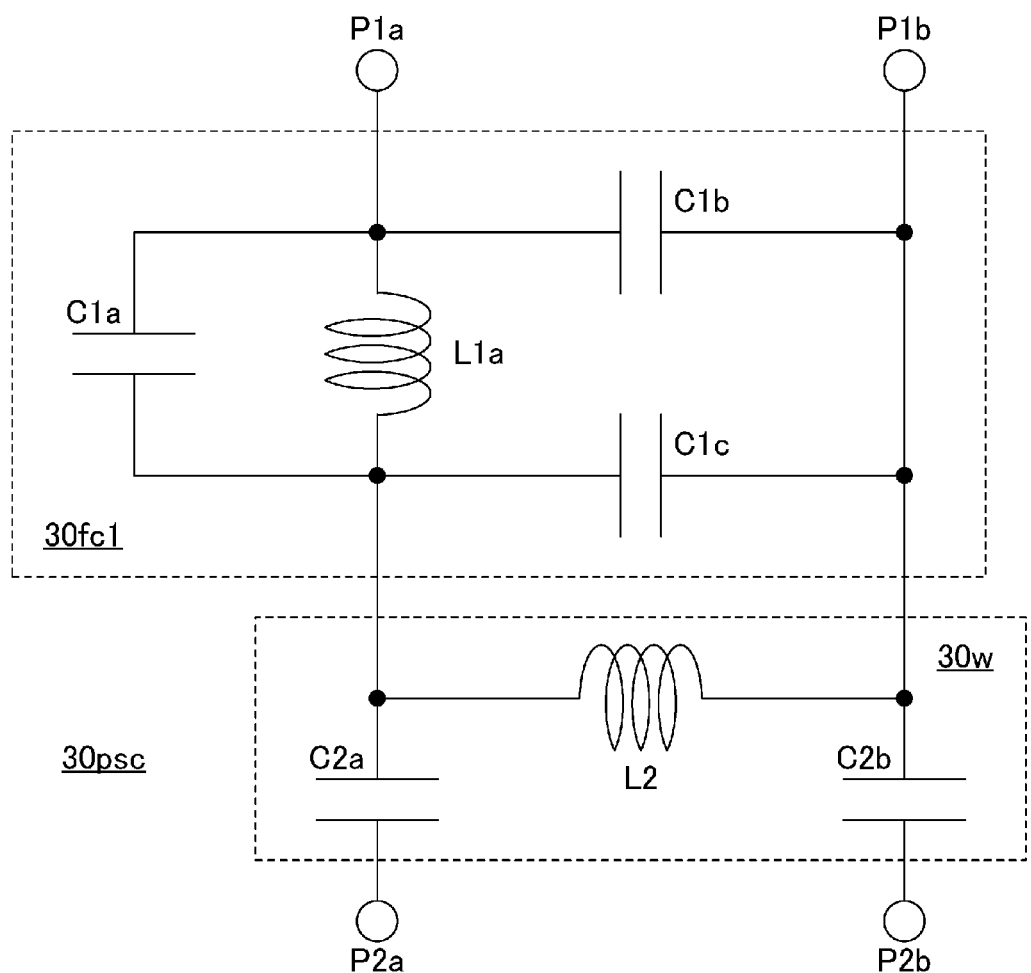
FIG. 5 is a circuit diagram representing an example of a power feeding circuit incorporated within a power feeding circuit substrate shown in FIG. 4.

In view of such a problem, the present preferred embodiment includes filter circuit 30fc1 and band broadening circuit 30w shown in FIG. 5 provided at power feeding circuit 30psc. Referring to FIG. 5, filter circuit 30fc1 preferably includes capacitors C1a-C1c, and an inductor L1a. Band broadening circuit 30w preferably includes capacitors C2a-C2b and an inductor L2. In other words, filter circuit 30fc1 is an unbalance type filter, constituted as a lowpass filter including a π type resonance circuit (one stage). This filter circuit is configured to attenuate the frequency of the harmonic wave region of GSM 850 and GSM 900. Band broadening circuit 30w is a matching circuit configured to allow impedance matching between RFIC chip 32cp and ground electrode 16gd for the RFID by a wide frequency band, functioning as a matching circuit together with loop electrode 16lp. A method of band-broadening the impedance matching includes, for example, broadening the resonant characteristic by increasing the inductance component and reducing the capacitance component, or coupling a plurality of resonance points.

Connection terminal P1a is connected with connection terminal P2a via inductor L1a and capacitor C2a connected in series. Connection terminal P1b is connected with connection terminal P2b via capacitor C2b. Capacitor C1a is connected parallel to inductor L1a.

Capacitor C1b includes one end connected to one end of capacitor C1a and one end of inductor L1a, and the other end connected to connection terminal P1b. Capacitor C1c includes one end connected to the other ends of capacitor C1a and inductor L1a, and the other end connected to connection terminal P1b. Inductor L2 has one end connected to the other end of inductor L1a, and the other end connected to connection terminal P1b.

Power feeding circuit 30psc configured as set forth above has the frequency characteristics shown in FIGS. 6A and 6B. Referring to FIGS. 6A and 6B, the insertion loss varies along a curve CV1a, and the reflection loss from RFID device 28 varies along a curve CV2a. As used herein, "reflection loss" is "0" when the input towards RFID device 28 is entirely reflected, and is reduced from "0" as a function of increase of the amount of signals input to RFID device 28.

According to curve CV1a, the insertion loss rapidly decreases in the vicinity of 2.0 GHz, and rapidly increases at the band of generally 850 MHz-940 MHz (strictly, in the vicinity of 875 MHz and in the vicinity of 920 MHz) (insertion loss exceeds −15 dB). According to curve CV2a, the reflection loss becomes lower than "0" at the band of generally 850 MHz-940 MHz, and rapidly decreases particularly in the vicinity of 875 MHz and the vicinity of 920 MHz. As a result, the harmonic wave component of GSM system communication signals is attenuated by filter circuit 30fc1 whereas the RFID system communication signals pass through filter circuit 30fc1.

The reason why curve CV1a rapidly decreases in the vicinity of 2.0 GHz is because the LC resonance frequency of filter circuit 30fc1 is set in the vicinity of 2.0 GHz. The reason why curve CV1a exhibits an attenuation characteristic at the band greater than or equal to 1.2 GHz (insertion loss becomes lower than −50 dB) is because capacitors C1b and C1c are provided in parallel in filter circuit 30fc1. Moreover, the reason why curve CV2a rapidly decreases in the vicinity of 875 MHz and in the vicinity of 920 MHz is because the LC resonance frequency of band broadening circuit 30w is set in the vicinity of 875 MHz and in the vicinity of 920 MHz.

Thus, RFIC chip 32cp provided at RFID device 28 processes RFID system communication signals belonging to the band of 902 MHz-928 MHz (corresponding to GSM 850 standard) or 865 MHz-868 MHz (corresponding to GSM 900 standard) to execute near field radio communication.

Further, front end module 24 and BBIC chip 22 for GSM provided at transmission and reception block 20 are configured to process GSM system communication signals belonging to the band of 824 MHz-849 MHz and 869 MHz-894 MHz (corresponding to GSM 850 standard) or the band of 880 MHz-915 MHz and 925 MHz-960 MHz (corresponding to GMS 900 standard) to execute mobile communication.

Filter circuit 30fc1 provided at RFID device 28 takes the band of generally 850 MHz-940 MHz where RFID system communication signals appear as the pass band, and the band greater than or equal to 1.2 GHz where a harmonic wave component of GSM system communication signals appear as the attenuation band.

When a GSM system communication signal is input to RFID device 28, the harmonic wave component of the GSM system communication signal is generated at RFIC chip 32cp for RFID. It is to be noted that the generated harmonic wave component is attenuated at filter circuit 30fc1. Therefore, this harmonic wave component will not readily be output from RFID device 28. Accordingly, the phenomenon of the harmonic wave component of the GSM system communication signal disturbing the operation of transmission and reception block 20, i.e. mobile communication, is suppressed.

Since filter circuit 30fc1 takes the frequency band to which RFID communication signals belong as the pass band, the phenomenon of filter circuit 30fc1 disturbing the operation of RFIC chip 32cp, i.e. disturbing near field radio communication, is significantly reduced or prevented. Thus, the communication performance in near field radio communication will not be greatly degraded.

The spurious by a harmonic wave may also be generated in the case of, in addition to the combination of an UHF band RFID system and GSM 900/GSM 850 system, a combination of an RFID system and a mobile communication system such as DCS and CDMA, a combination of an RFID system and a near field communication system such as Bluetooth (registered trademark) or wireless LAN, or the like. However, by providing a filter circuit between the IC and radiating element of one system (for example, the RFID system), directed to attenuating the communication frequency or harmonic wave component thereof of the other system (for example, GSM, DCS, CDMA, Bluetooth, wireless LAN, or the like), the generation of spurious at the other system is significantly reduced or prevented to improve the communication performance thereof.

Figure 7:
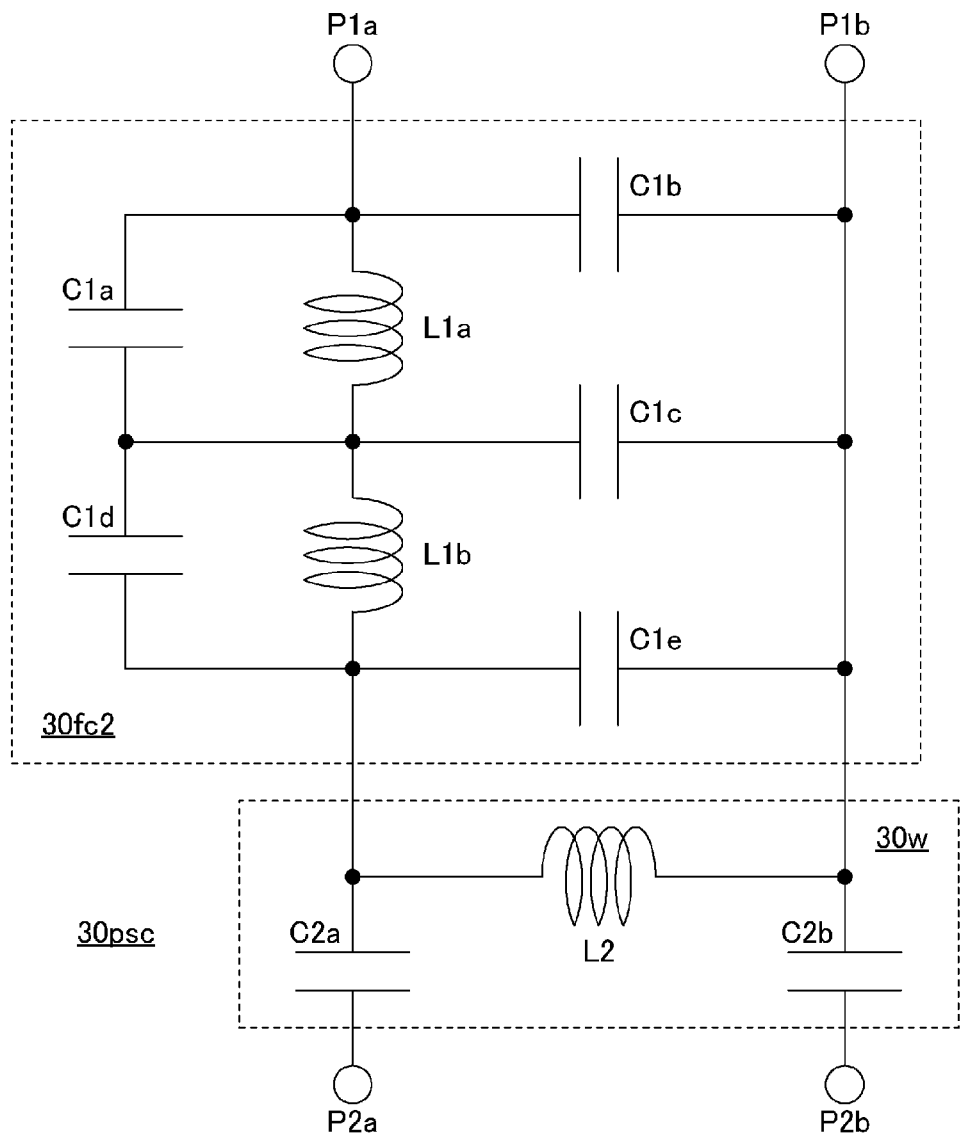
FIG. 7 is a circuit diagram representing another example of a power feeding circuit incorporated within the power feeding circuit substrate shown in FIG. 4.

At a communication device 10 of another preferred embodiment of the present invention, a filter circuit 30fc2 and band broadening circuit 30w shown in FIG. 7 are provided at power feeding circuit 30psc. Filter circuit 30fc2 preferably includes π type resonance circuits of two stages. Specifically, inductor L1b is provided between inductor L1a and capacitor C2a; capacitor C1d is connected parallel to inductor L1b; and capacitor C1e is provided between the node of inductor L1b and capacitor C2a and connection terminal P1b.

Power feeding circuit 30psc configured as set forth above has the frequency characteristics shown in FIGS. 8A and 8B. In FIGS. 8A and 8B, the insertion loss varies along a curve CV1b whereas the reflection loss from RFID device 28 varies along a curve CV2b.

According to curve CV1b, the insertion loss rapidly decreases in the vicinity of about 1.7 GHz and in the vicinity of about 2.5 GHz, and rapidly increases at the band of generally about 830 MHz to about 970 MHz, for example. According to curve CV2b, the reflection loss becomes lower than "0" at the band of generally about 830 MHz to about 970 MHz, for example. By exhibiting such frequency characteristics, the harmonic wave component of GSM system communication signals is attenuated by filter circuit 30fc2, whereas RFID system communication signals pass through filter circuit 30fc2. In other words, two attenuation poles are produced with filter circuit 30fc2. By setting the attenuation extremes to match the frequency of each harmonic wave (for example, second order harmonic and third order harmonic), each harmonic wave is made to attenuate effectively. The resonance circuit is not limited to two stages, and may be of multi-stages of three stages or more, for example.

Figure 9:
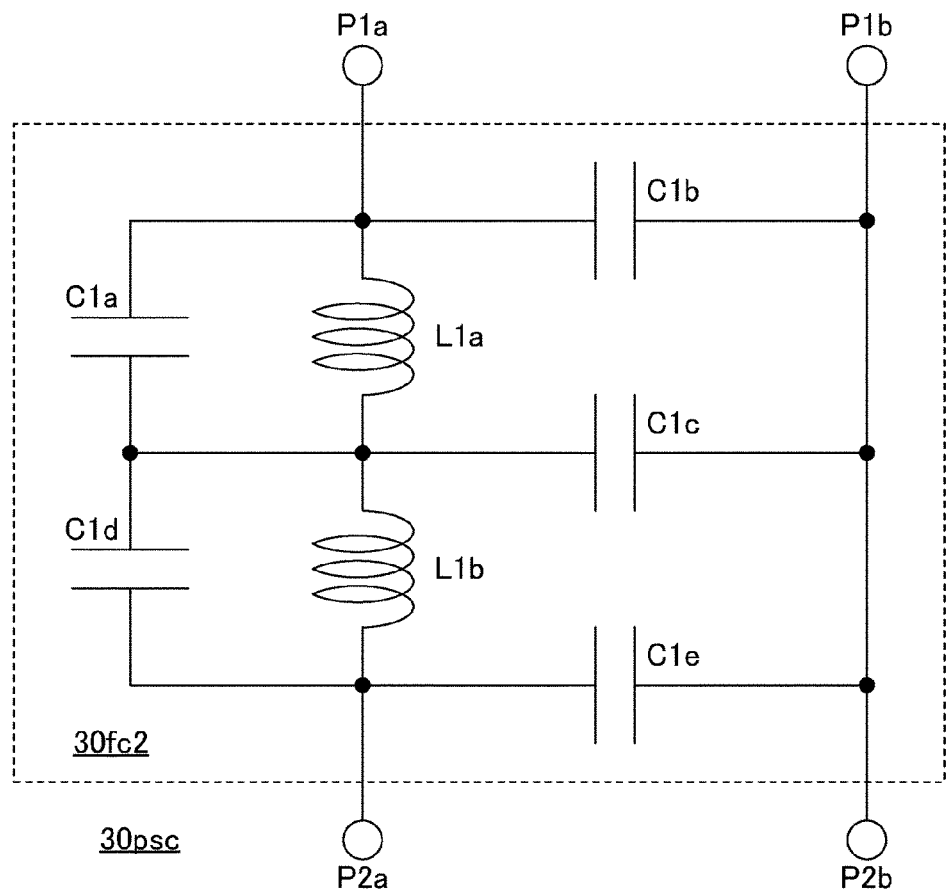
FIG. 9 is a circuit diagram representing still another example of a power feeding circuit incorporated within the power feeding circuit substrate shown in FIG. 4.

In communication device 10 of still another preferred embodiment, filter circuit 30fc2 shown in FIG. 9 constitutes power feeding circuit 30psc. Specifically, band broadening circuit 30w is omitted, as compared to that shown in FIG. 7. Power feeding circuit 30psc has the frequency characteristics shown in FIGS. 10A and 10B. In FIGS. 10A and 10B, the insertion loss varies along a curve CV1c whereas the reaction loss from RFID device 28 varies along a curve CV2c.

Curve CV1c rapidly decreases in the vicinity of about 1.7 GHz and in the vicinity of about 2.5 GHz, and increases rapidly at the band of generally about 880 MHz to about 950 MHz, for example. Curve CV2c becomes lower than "0" at the band of generally about 880 MHz to about 950 MHz, for example. As a result, the harmonic wave component of GSM system communication signals is attenuated by filter circuit 30fc2, whereas RFID system communication signals pass through filter circuit 30f.

Capacitors C1a-C1e, C2a-C2b and inductors L1a-L1b and L2 shown in FIGS. 5, 7 and 9 can have appropriate values according to the combination of each of the aforementioned systems. Moreover, some of the elements may be omitted, as necessary. In other words, the band broadening circuit is dispensable although the band pass width may slightly become narrower. Moreover, the band broadening circuit does not have to be integrated with the power feeding circuit substrate, and may be provided at another substrate.

Figure 11:
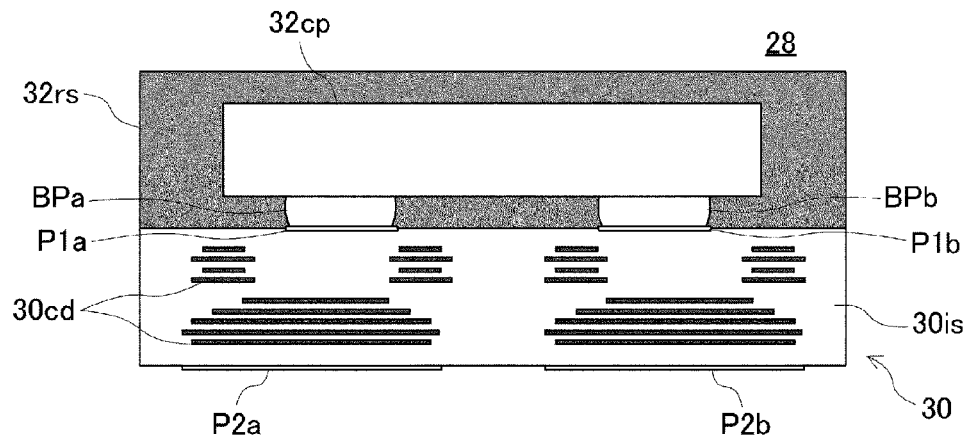
FIG. 11 is a sectional view representing another example of a layered state of a transmission and reception circuit applied to the preferred embodiment shown in FIGS. 2A and 2B.

In a communication device 10 according to another preferred embodiment of the present invention, power feeding circuit substrate 30 constituting RFID device 28 has the structure shown in FIG. 11. Power feeding circuit 30psc provided at power feeding circuit substrate 30 is constituted of a filter circuit 30fc3 and a matching circuit 30ml shown in FIG. 12. Filter circuit 30fc3 includes a filter 30/1 provided on a signal line LN1 connecting connection terminals P1a and P2a, and a filter 30/2 provided on a signal line LN2 connecting connection terminals P1b and P2b. More specifically, signal lines LN1 and LN2 are equivalent to a differential path, and filter circuit 30fc3 is equivalent to a balance filter circuit. By mainly providing an inductor at the upper layer side of power feeding circuit substrate 30 (the side where the RFIC chip is mounted) and defining a capacitor mainly at the lower layer side (the side mounted to the printed circuit board), the floating inductor component between the RFIC chip and inductor is preferably significantly reduced, and the mounting to the printed circuit board is improved. Particularly, the substrate is thinned without greatly deteriorating the Q value of the inductor (coil pattern) since the area of the electrode constituting the capacitor becomes smaller towards the upper layer side from the lower layer side.

Specifically, connection terminal P1a is connected to one end of inductor L1c, and the other end of inductor L1c is connected to connection terminal P2a via capacitor C2d. Capacitor C1f is connected parallel to inductor L1c. Connection terminal P1b is connected to one end of inductor L1d, and the other end of inductor L1d is connected to connection terminal P2b via capacitor C2e. Capacitor C1g is connected parallel to inductor L1d. Capacitor C3 includes one end connected to the other end of inductor L1c, and the other end connected to the other end of inductor L1d.

As used herein, filter 30/1 preferably includes one inductor L1c and two capacitors C1f and C3. Filter 30/2 preferably includes one inductor L1d and two capacitors C1g and C3. Matching circuit 30ml preferably includes three capacitors C2d, C2e and C3.

Figure 13:
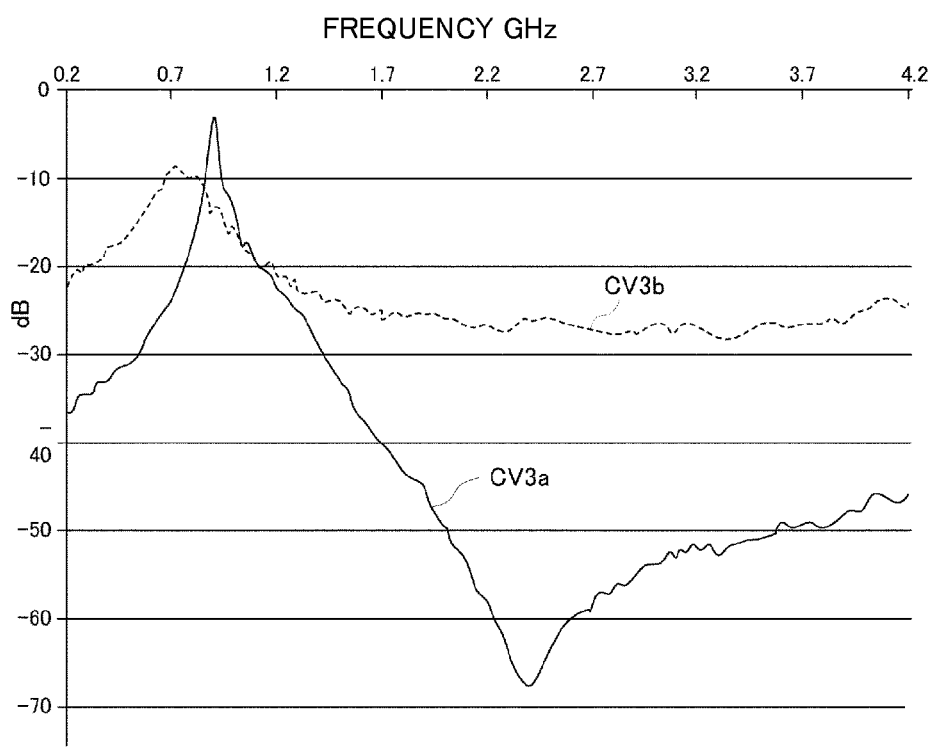
FIG. 13 is a graph representing an example of frequency characteristics of the power feeding circuit shown in FIG. 12.
Figure 14:
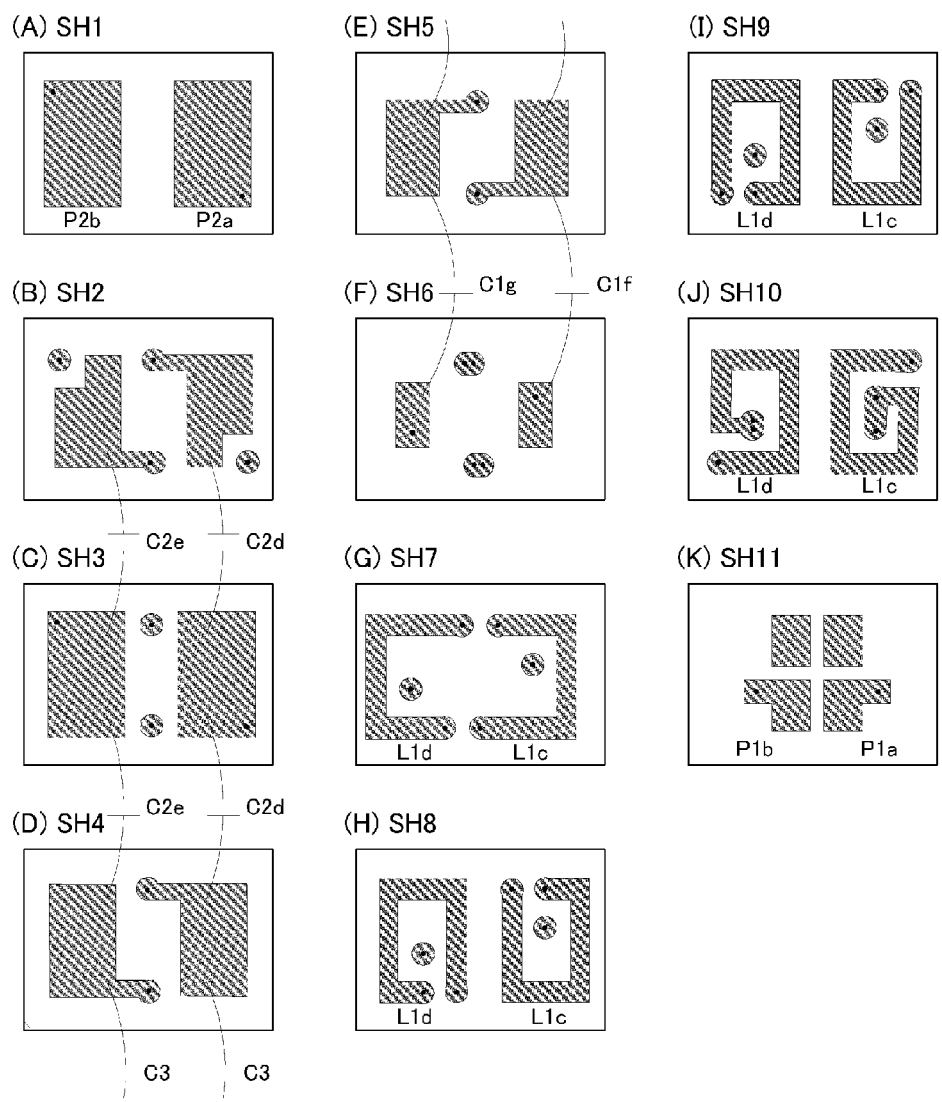
FIG. 14A is a plan view representing an example of a sheet SH1 constituting a power feeding circuit substrate.
FIG. 14B is a plan view representing an example of a sheet SH2 constituting a power feeding circuit substrate.
FIG. 14C is a plan view representing an example of a sheet SH3 constituting a power feeding circuit substrate.
FIG. 14D is a plan view representing an example of a sheet SH4 constituting a power feeding circuit substrate.
FIG. 14E is a plan view representing an example of a sheet SH5 constituting a power feeding circuit substrate.
FIG. 14F is a plan view representing an example of a sheet SH6 constituting a power feeding circuit substrate.
FIG. 14G is a plan view representing an example of a sheet SH7 constituting a power feeding circuit substrate.
FIG. 14H is a plan view representing an example of a sheet SH8 constituting a power feeding circuit substrate.
FIG. 14I is a plan view representing an example of a sheet SH9 constituting a power feeding circuit substrate.
FIG. 14J is a plan view representing an example of a sheet SH10 constituting a power feeding circuit substrate.
FIG. 14K is a plan view representing an example of a sheet SH11 constituting a power feeding circuit substrate.

Power feeding circuit 30psc configured as set forth above has the frequency characteristics adjusted so as to draw a curve CV3a shown in FIG. 13. Curve CV3b of FIG. 13 represents the frequency characteristics of power feeding circuit 30psc when filter circuit 30fc3 is omitted.

According to curve CV3a, the insertion loss shows a valley with the vicinity of about 2.5 GHz as the lowest level, and increases rapidly at the band of generally about 830 MHz to about 970 MHz, for example. By exhibiting such frequency characteristics, the harmonic wave component of GSM system communication signals is attenuated by filter circuit 30fc3, whereas RFID system communication signals pass through filter circuit 30fc3.

Power feeding circuit substrate 30 is produced by stacking 11 sheets SH1-SH11 shown in FIGS. 14A to 14K. Specifically, sheet SH1 has sheet SH2 layered thereon; sheet SH3 is layered on sheet SH2; sheet SH4 is layered on SH3; sheet SH5 is layered on sheet SH4; sheet SH6 is layered on sheet SH5; sheet SH7 is layered on sheet SH6; sheet SH8 is layered on sheet SH7; sheet SH9 is layered on sheet SH8; sheet SH10 is layered on sheet SH9; and sheet SH11 is layered on sheet SH10.

For all sheets SH1-SH11, the open region corresponds to an insulator, and the hatched region corresponds to a conductor. For sheets SH1-SH10, a conductor is provided at the bottom surface of the insulator. For sheet SH11, a conductor is provided at the top surface of the insulator. Sheets SH1-SH11 are interconnected by via hole conductors indicated by ●. Sheet SH1 has the right side conductor connected to connection terminal P2a, and the left side conductor connected to connection terminal P2b. Sheet SH11 has the right side conductor connected to connection terminal P1a, and the left side conductor connected to connection terminal P1b.

The right side conductors of sheets SH2-SH4 constitute capacitor C2d. The left side conductors of sheets SH2-SH4 constitute capacitor C2e. The left and right conductors of sheets SH4-SH5 constitute capacitor C3. The right side conductors of sheets SH5-SH6 constitute capacitor C1f. The left side conductors of sheets SH5-SH6 constitute capacitor C1g. The right side conductors of sheets SH7-SH10 constitute inductor L1c. The left side conductors of sheets SH7-SH10 constitute inductor L1d.

Figure 15:
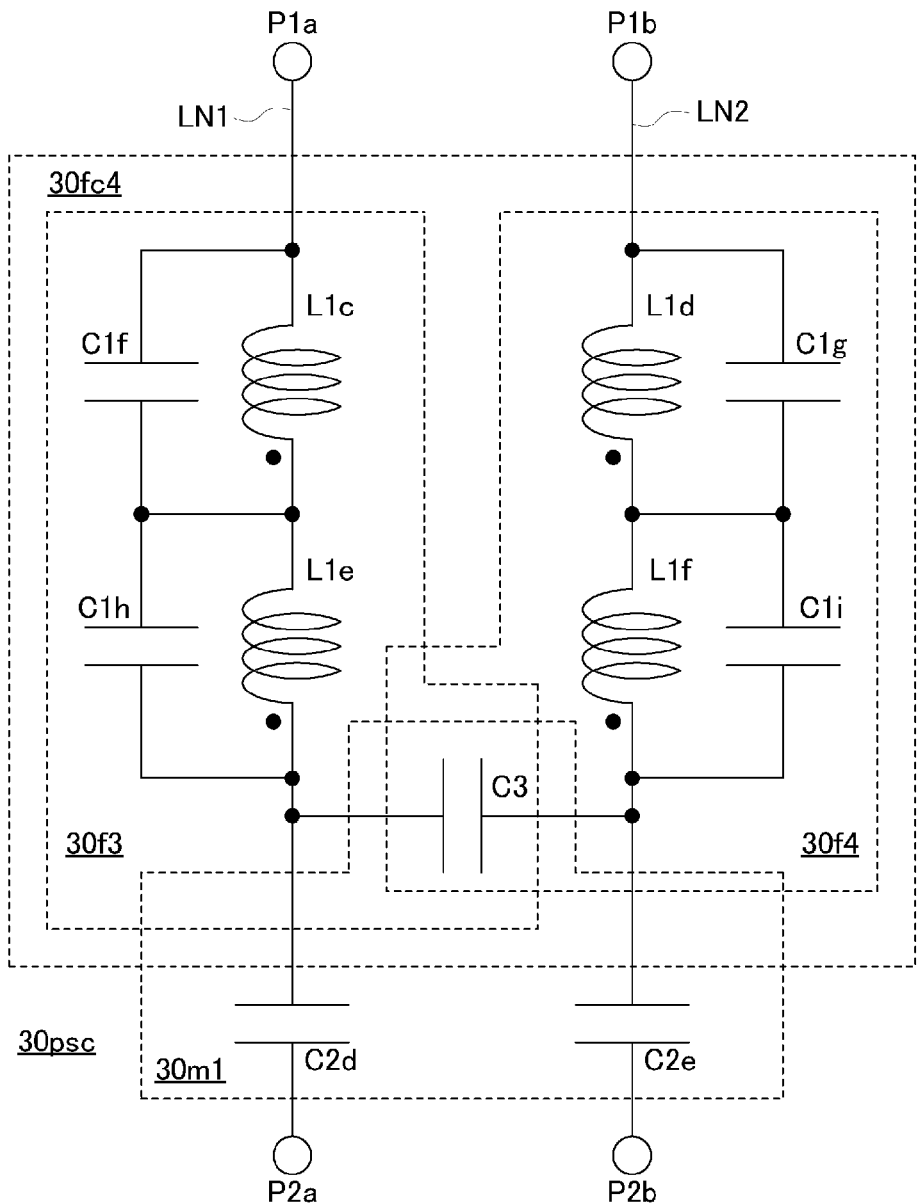
FIG. 15 is a circuit diagram representing a further example of a power feeding circuit incorporated within the power feeding circuit substrate shown in FIG. 11.

At communication device 10 of a further preferred embodiment, power feeding circuit 30psc provided at power feeding circuit substrate 30 constituting RFID device 28 is constituted of a filter circuit 30fc4 and a matching circuit 30ml shown in FIG. 15. Filter circuit 30fc4 includes a filter 30/3 provided on signal line LN1 connecting connection terminals P1a and P2a, and a filter 30/4 provided on signal line LN2 connecting connection terminals P1b and P2b.

More specifically, connection terminal P1a is connected to one end of inductor L1c, and the other end of inductor L1c is connected to one end of inductor L1e. The other end of inductor L1e is connected to connection terminal P2a via capacitor C2d. Capacitor C1f is connected parallel to inductor L1c. Capacitor C1h is connected parallel to inductor L1e.

Connection terminal P1b is connected to one end of conductor L1d, and the other end of inductor L1d is connected to one end of inductor L1f. The other end of inductor L1f is connected to connection terminal P2b via capacitor C2d. Capacitor C1g is connected parallel to inductor L1d. Capacitor C1i is connected parallel to inductor L1f. Capacitor C3 includes one end connected to the other end of inductor L1e, and the other end connected to the other end of inductor L1f.

Filter 30/3 preferably includes two inductors L1c and L1e, and three capacitors C1f, C1h and C3. Filter 30/4 preferably includes two inductors L1d and L1f, and three capacitors C1g, C1i and C3. Matching circuit 30ml preferably includes three capacitors C2d, C2e and C3.

Figure 16:
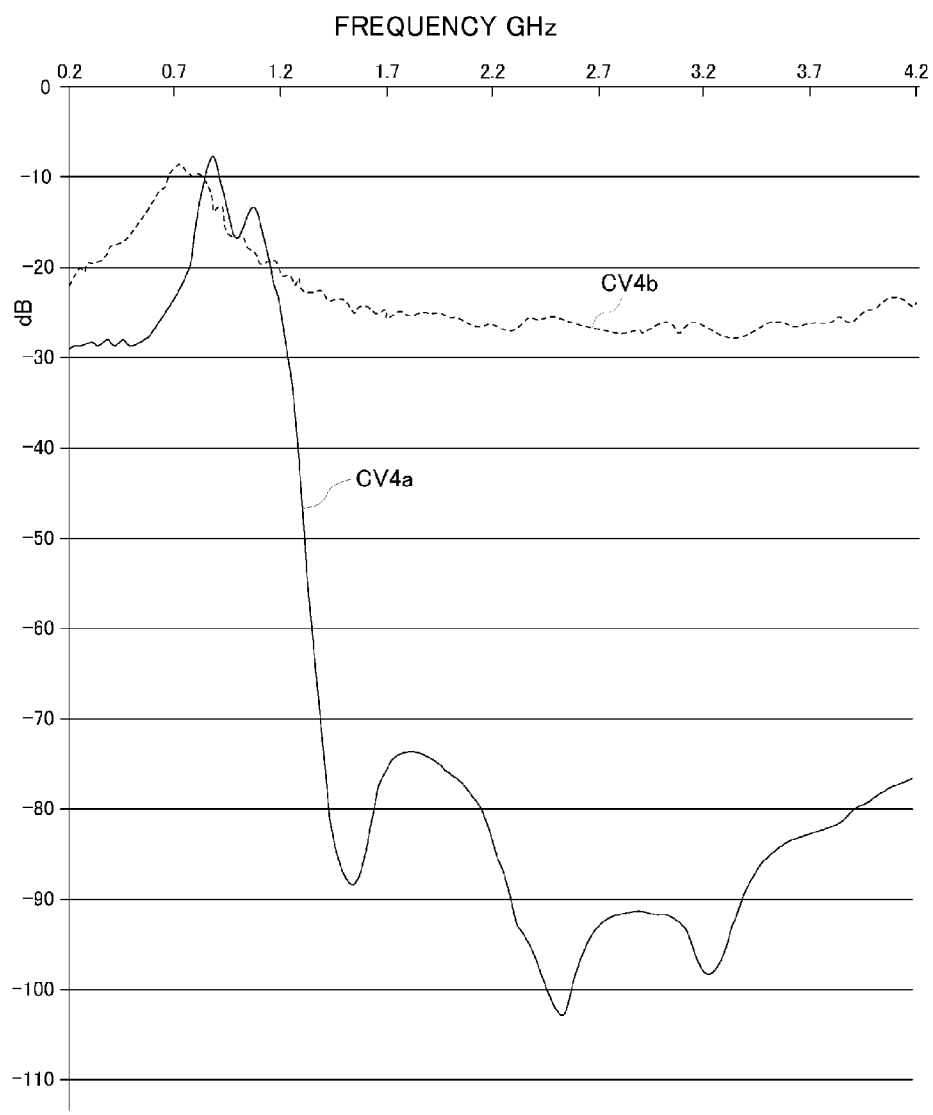
FIG. 16 is a graph representing an example of frequency characteristics of the power feeding circuit shown in FIG. 15.

Power feeding circuit 30psc configured as set forth above is adjusted such that the frequency characteristics draw a curve CV4a shown in FIG. 16. Curve CV4b of FIG. 16 represents the frequency characteristics of power feeding circuit 30psc when filter circuit 30fc4 is omitted.

According to curve CV4a, the insertion loss decreases to define a valley in the vicinity of about 1.5 GHz, in the vicinity of about 2.5 GHz, and in the vicinity of about 3.2 GHz, and rapidly increases at the band of generally about 830 MHz to about 970 MHz, for example. By exhibiting such frequency characteristics, the harmonic wave component of GSM system communication signals is attenuated by filter circuit 30fc4, whereas RFID system communication signals pass through filter circuit 30fc4.

Figure 12:
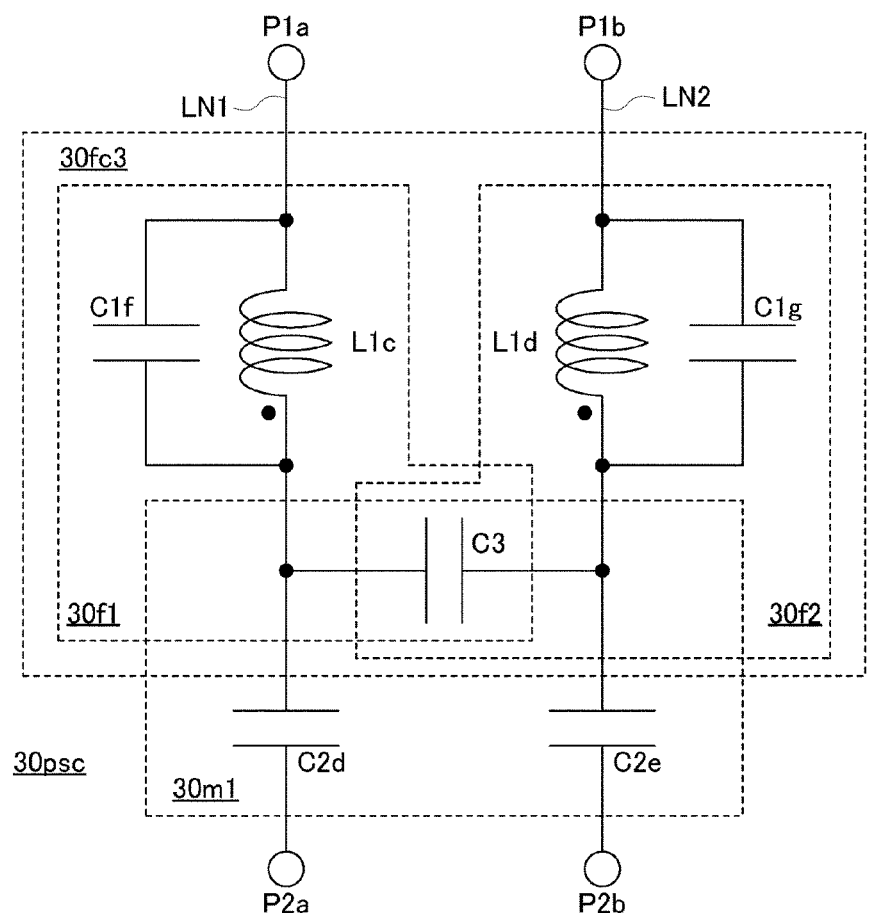
FIG. 12 is a circuit diagram representing an example of a power feeding circuit incorporated within the power feeding circuit substrate shown in FIG. 11.
Figure 17:
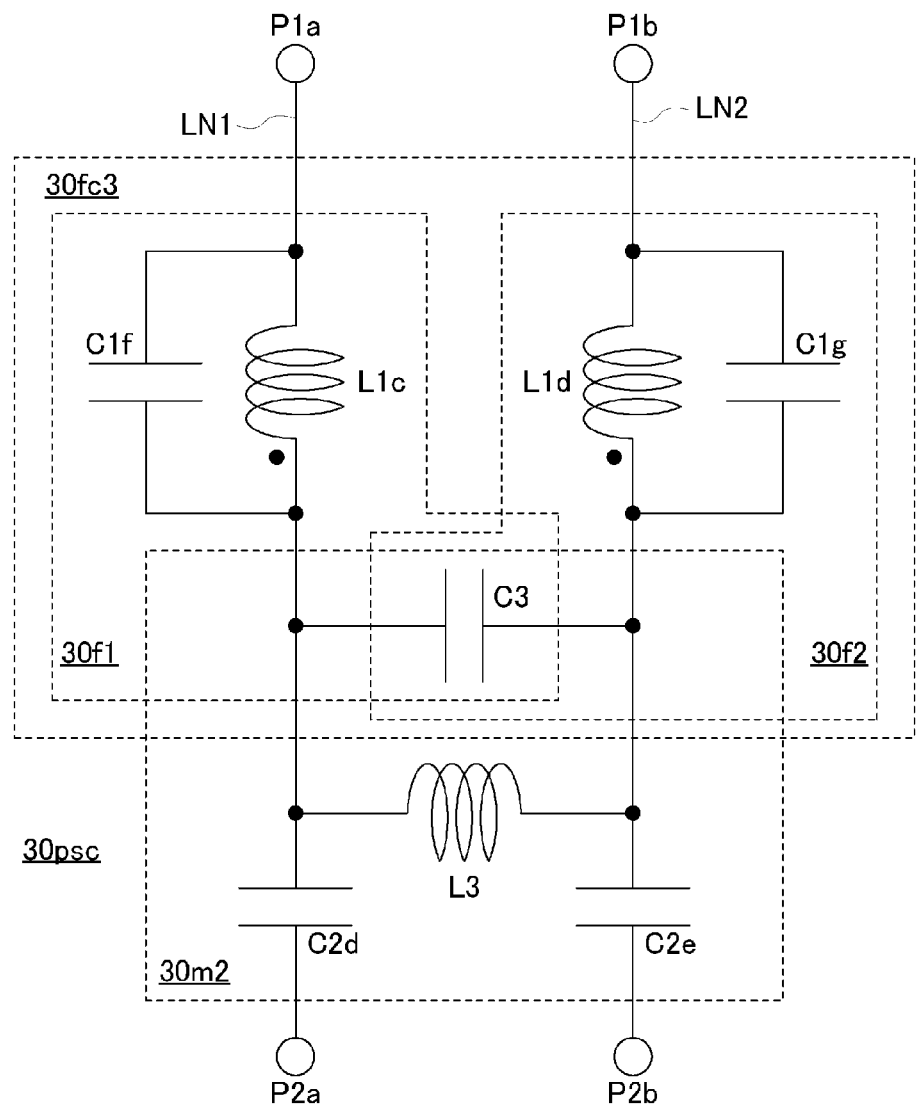
FIG. 17 is a circuit diagram representing a further example of a power feeding circuit incorporated within the power feeding circuit substrate shown in FIG. 11.
Figure 18:
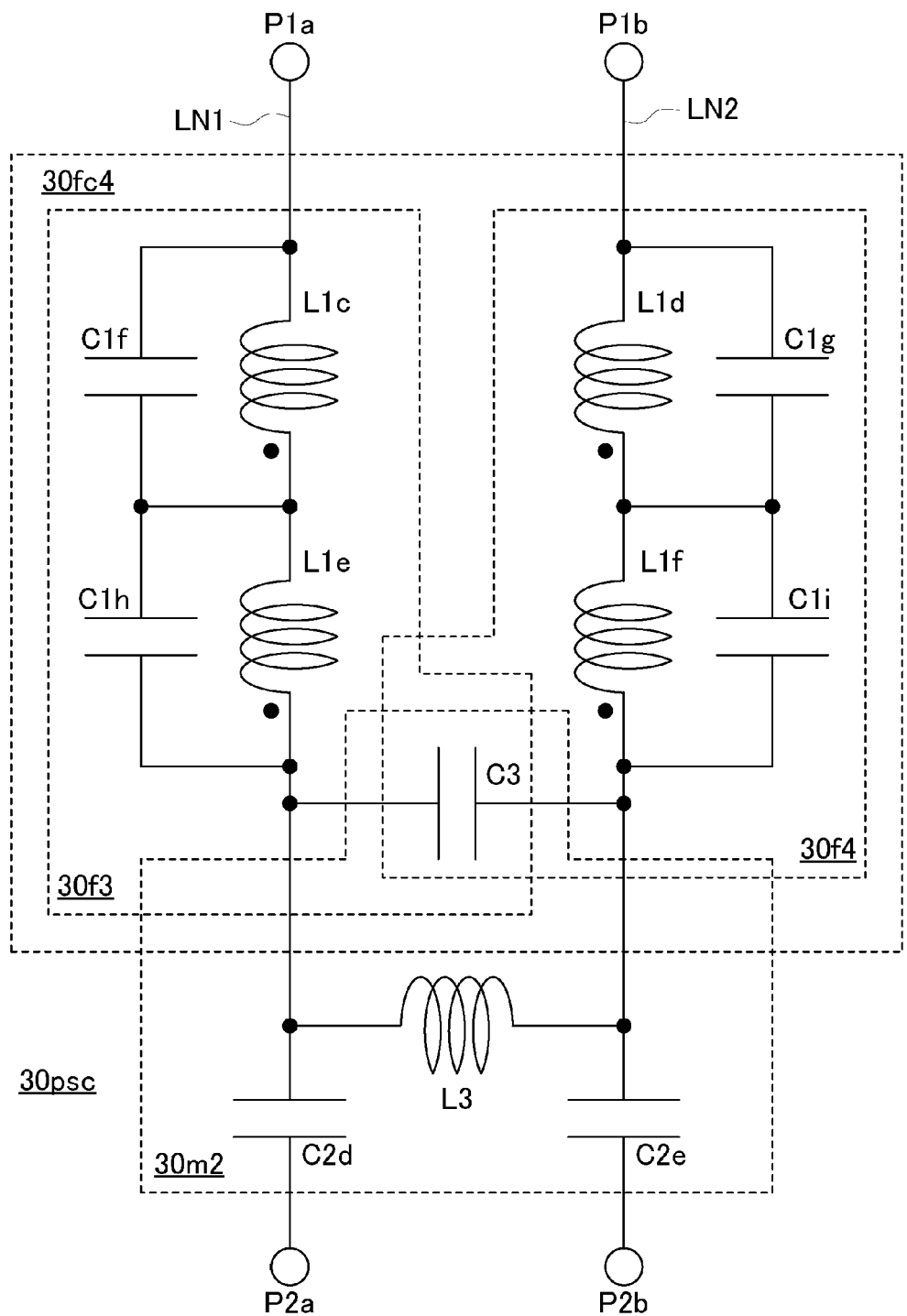
FIG. 18 is a circuit diagram representing still another example of a power feeding circuit incorporated within the power feeding circuit substrate shown in FIG. 11.

Matching circuit 30ml shown in FIG. 12 or FIG. 15 may have an inductor L3 added in the manner shown in FIG. 17 or FIG. 18. Accordingly, a matching circuit 30m2 exhibiting another characteristic is provided. According to FIGS. 17-18, inductor L3 is connected parallel to capacitor C3. Such addition of inductor L3 allows the passing characteristics to be further broadened.

Figure 19:
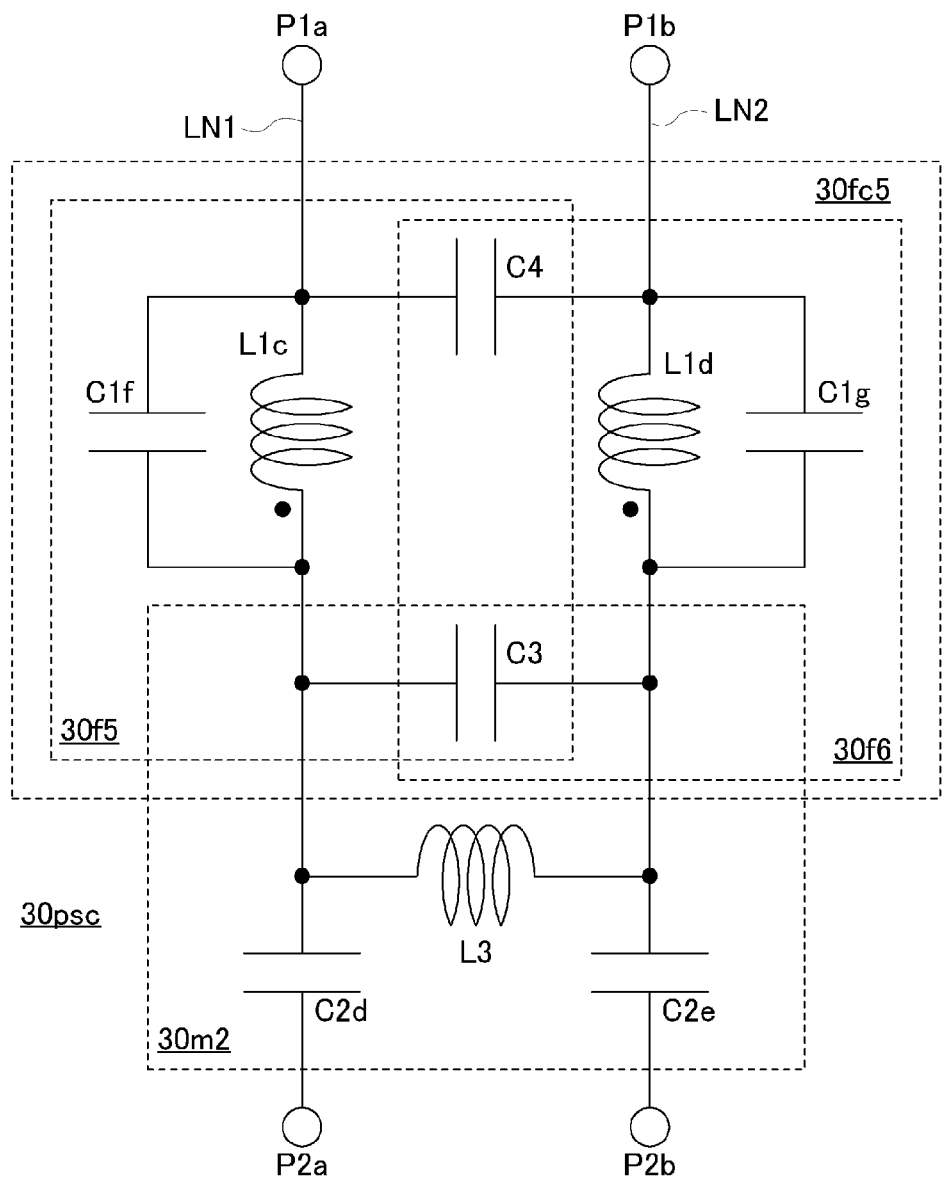
FIG. 19 is a circuit diagram representing another example of a power feeding circuit incorporated within the power feeding circuit substrate shown in FIG. 11.

Filter circuit 30fc3 shown in FIG. 17 may have a capacitor C4 added in the manner shown in FIG. 19. Accordingly, a filter circuit fc5 showing another characteristic is formed. In this case, capacitors C1f, C3, and C4 and inductor L1c constitute filter 30f5. Capacitors C1g, C3 and C4 and inductor L1d constitute filter 30f6.

Figure 20:
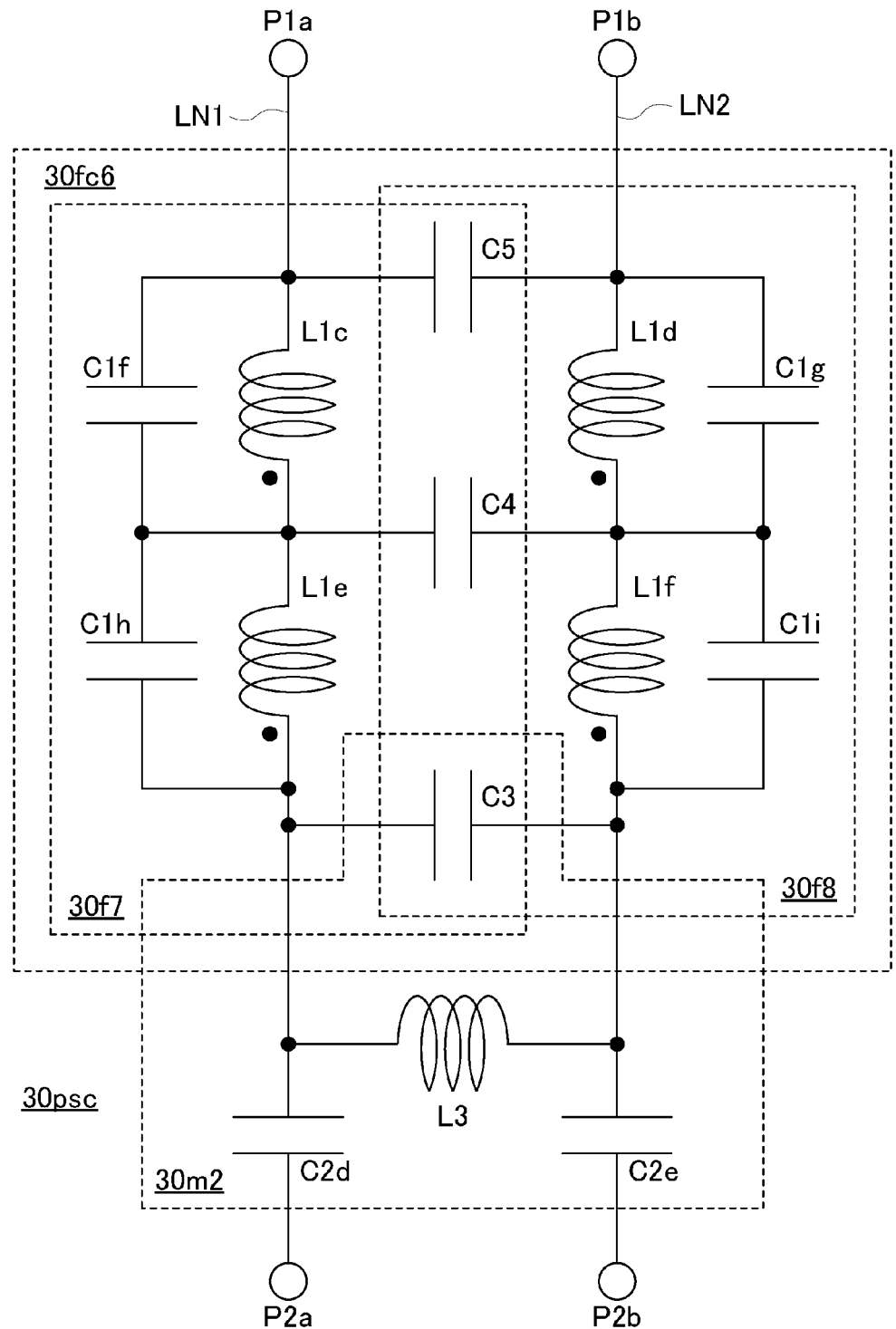
FIG. 20 is a circuit diagram showing a further example of a power feeding circuit incorporated within the power feeding circuit substrate shown in FIG. 11.

Filter circuit 30fc4 shown in FIG. 18 may have capacitors C4 and C5 added in the manner shown in FIG. 20. Accordingly, a filter circuit fc6 showing still another characteristic is provided. In this case, capacitors C1f, C1h, C3-C5 and inductors L1c, L1e constitute filter 30f7. Capacitors C1g, C1i, C3-C5 and inductors L1d, L1f constitute filter 30f8. The addition of these capacitors allows the amount of attenuation of the harmonic wave component to be increased.

The symmetry of the balance type filter is improved in the configuration of each of FIGS. 19-20, which in turn improves the filter characteristic.

Figure 21:
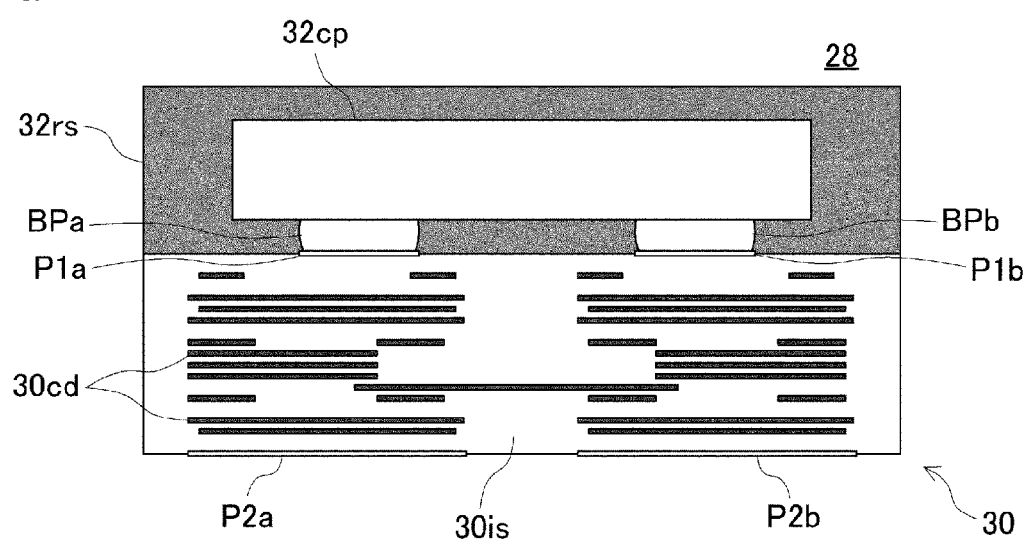
FIG. 21 is a sectional view showing a further example of a layered state of a transmission and reception circuit applied to the preferred embodiment shown in FIGS. 2A and 2B.

At a communication device 10 according to a further preferred embodiment, power feeding circuit substrate 30 constituting RFID device 28 has the configuration shown in FIG. 21. Power feeding circuit 30psc provided at power feeding circuit substrate 30 preferably includes filter circuit 30fc7 and band broadening circuit 30w shown in FIG. 22. Filter circuit 30fc7 includes a filter 30f9 provided on signal line LN1 connecting connection terminals P1a and P2a, and a filter 30f10 provided on signal line LN2 connecting connection terminals Plb and P2b. Namely, signal lines LN1 and LN2 are equivalent to a differential path, and filter circuit 30fc7 is equivalent to a balance filter circuit.

Specifically, connection terminal P1a is connected to connection terminal P2a via inductors L1g and L1k and capacitor C2a connected in series. Connection terminal P1b is connected to connection terminal P2b via inductors L1h, L1m and capacitor C2b connected in series.

Capacitor C1j includes one end connected to the node of inductors L1g and L1k, and the other end connected to the node of inductors L1h and L1m via inductor L1i. Capacitor C1k has one end connected to the node of inductors L1h and L1m, and the other end connected to the node of inductors L1g and L1k via inductor L1j. Moreover, inductor L2 has one end connected to the node of inductor L1k and capacitor C2a, and the other end connected to the node of inductor L1m and capacitor C2b.

As used herein, filter 30f9 preferably includes two capacitors C1j and C1k, and four inductors L1g, L1k, L1i and L1j. Filter 30f10 preferably includes two capacitors C1j and C1k, and four inductors L1h, L1m, L1i and L1j. Band broadening circuit 30w preferably includes one inductor L2 and two capacitors C2a and C2b.

By providing capacitor C1j and inductor L1i connected in series between signal lines LN1 and LN2, and also providing capacitor C1k and inductor L1j connected in series between signal lines LN1 and LN2, the resonance frequency is adjusted to a desired value while suppressing or significantly reducing the inductance (suppressing or significantly reducing the transmission loss) of inductors L1g, L1k, L1h and L1m provided between signals lines LN1 and LN2.

Figure 23:
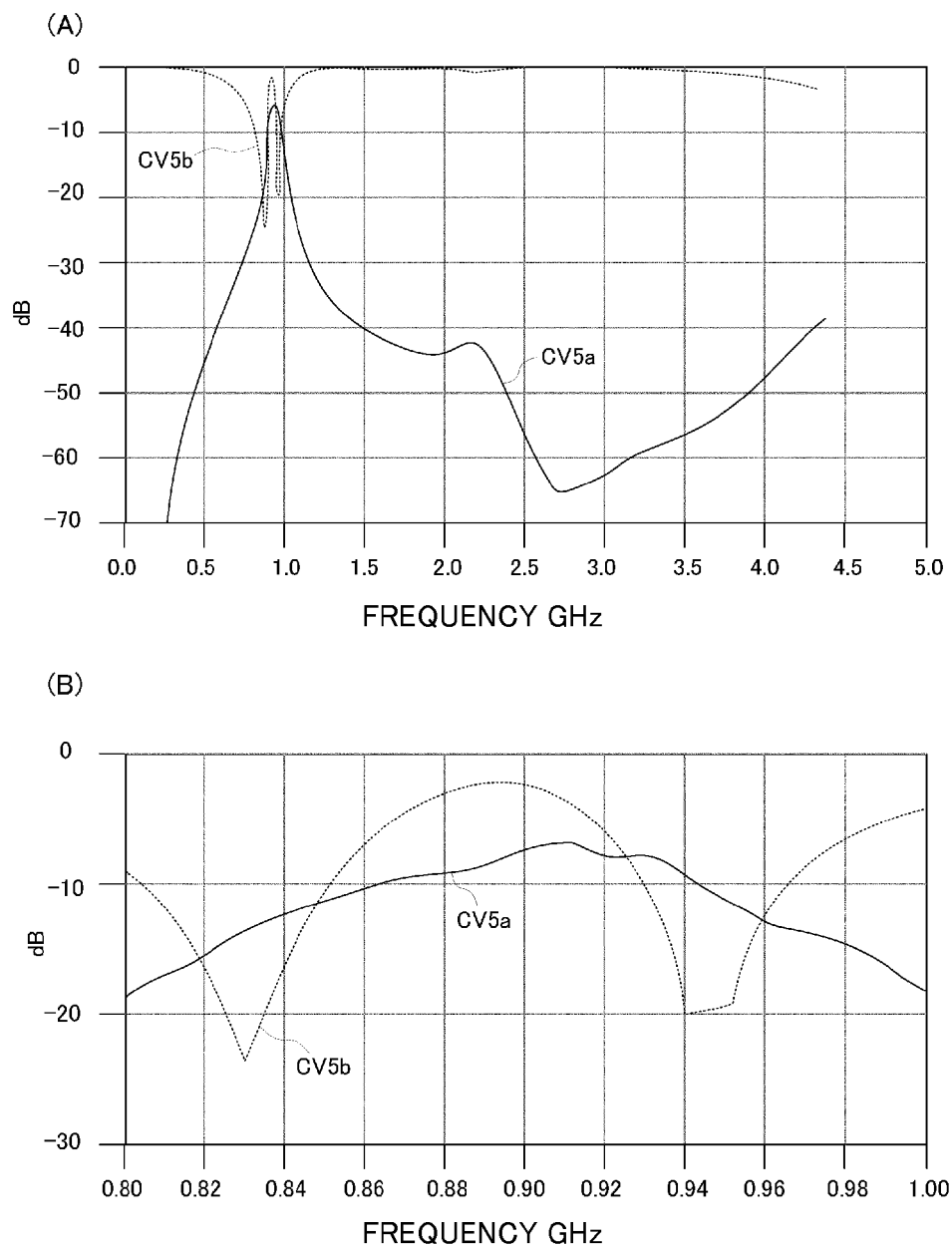
FIG. 23A is a graph representing an example of frequency characteristics of the power feeding circuit shown in FIG. 22.
FIG. 23B is an enlarged view of the main portion of the graph.

Power feeding circuit 30psc configured as set forth above has the frequency characteristics shown in FIG. 23A and FIG. 23B. In FIG. 23A and FIG. 23B, the insertion loss varies along a curve CV5a, whereas the reflection loss from RFID device 28 varies along a curve CV5b.

According to curve CV5a, the insertion loss rapidly decreases in the vicinity of about 2.7 GHz, and rapidly increases at the band of generally about 800 MHz to about 1.0 GHz (the signal level exceeds about −10 dB), for example. According to curve CV5b, the reflection loss rapidly decreases in the vicinity of about 830 MHz and in the vicinity of about 950 MHz, for example. Further, curve CV5c becomes lower than 0 dB at the band of about 800 MHz to about 1.0 GHz, for example.

As a result, the harmonic wave component of GSM system communication signals is attenuated by filter circuit 30fc9 while RFID system communication signals pass through filter circuit 30fc9.

Figure 24:
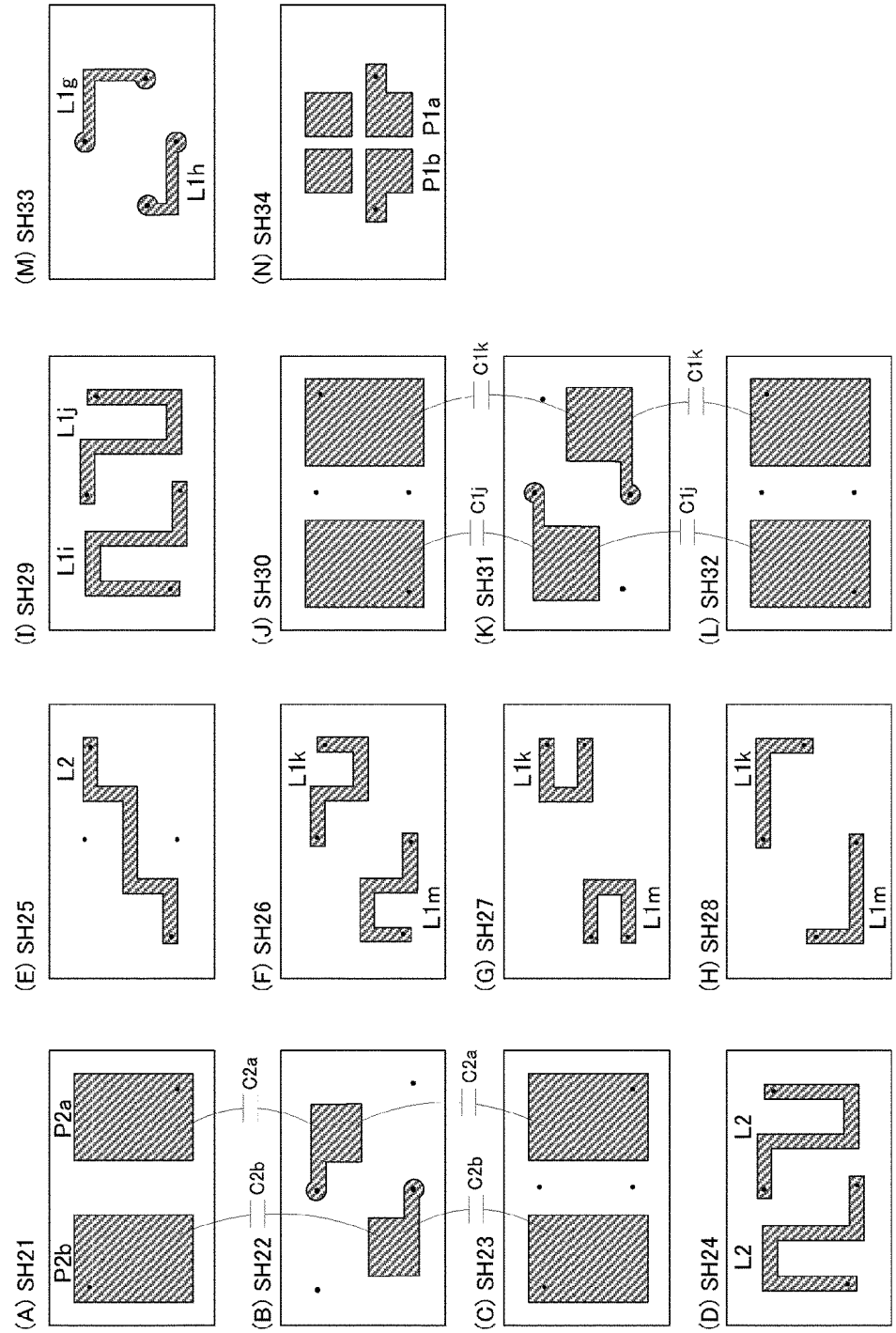
FIG. 24A is a plan view representing an example of a sheet SH21 constituting a power feeding circuit substrate.
FIG. 24B is a plan view representing an example of a sheet SH22 constituting a power feeding circuit substrate.
FIG. 24C is a plan view representing an example of a sheet SH23 constituting a power feeding circuit substrate.
FIG. 24D is a plan view representing an example of a sheet SH24 constituting a power feeding circuit substrate.
FIG. 24E is a plan view representing an example of a sheet SH25 constituting a power feeding circuit substrate.
FIG. 24F is a plan view representing an example of a sheet SH26 constituting a power feeding circuit substrate.
FIG. 24G is a plan view representing an example of a sheet SH27 constituting a power feeding circuit substrate.
FIG. 24H is a plan view representing an example of a sheet SH28 constituting a power feeding circuit substrate.
FIG. 24I is a plan view representing an example of a sheet SH29 constituting a power feeding circuit substrate.
FIG. 24J is a plan view representing an example of a sheet SH30 constituting a power feeding circuit substrate.
FIG. 24K is a plan view representing an example of a sheet SH31 constituting a power feeding circuit substrate.
FIG. 24L is a plan view representing an example of a sheet SH32 constituting a power feeding circuit substrate.
FIG. 24M is a plan view representing an example of a sheet SH33 constituting a power feeding circuit substrate.
FIG. 24N is a plan view representing an example of a sheet SH34 constituting a power feeding circuit substrate.

Power feeding circuit substrate 30 is produced by stacking 14 sheets SH21-SH34 shown in FIGS. 24A to 24N.

Specifically, sheet SH21 has sheet SH22 layered thereon; sheet SH23 is layered on sheet SH22; sheet SH24 is layered on sheet SH23; sheet SH25 is layered on sheet SH24; sheet SH26 is layered on sheet SH25; sheet SH27 is layered on sheet SH26; sheet SH28 is layered on sheet SH27; sheet SH29 is layered on sheet SH28; sheet SH30 is layered on sheet SH29; sheet SH31 is layered on sheet SH30; sheet SH32 is layered on sheet SH31; sheet SH33 is layer on sheet SH32; and sheet SH34 is layered on sheet SH33.

For all sheets SH21-SH34, the open region corresponds to an insulator, and the hatched region corresponds to a conductor. For sheets SH21-SH33, a conductor is provided at the bottom surface of the insulator. For sheet SH34, a conductor is provided at the top surface of the insulator. Sheets SH21-SH34 are interconnected by via hole conductors indicated by ●. Sheet SH21 has the right side conductor connected to connection terminal P2a and the left side conductor connected to connection terminal P2b. Sheet SH34 has the right lower side conductor connected to connection terminal P1a, and the left lower side conductor connected to connection terminal P1b.

The right side conductors of sheets SH21-SH23 constitute capacitor C2a. The left side conductors of sheets SH21-SH23 constitute capacitor C2b. The right side conductors of sheets SH30-SH32 constitute capacitor C1k. The left side conductors of sheets SH30-SH32 constitute capacitor C1j.

Additionally, the conductors of sheets SH24-SH25 constitute inductor L2. The right side conductors of sheets SH26-SH28 constitute inductor L1k. The left side conductors of sheets SH26-SH28 constitute inductor L1m.

Moreover, the left side conductor of sheet SH29 constitutes inductor L1i. The right side conductor of sheet SH29 constitutes inductor L1j. The right side conductor of sheet SH30 constitutes inductor L1g. The left side conductor of sheet SH30 constitutes inductor L1h.

Figure 22:
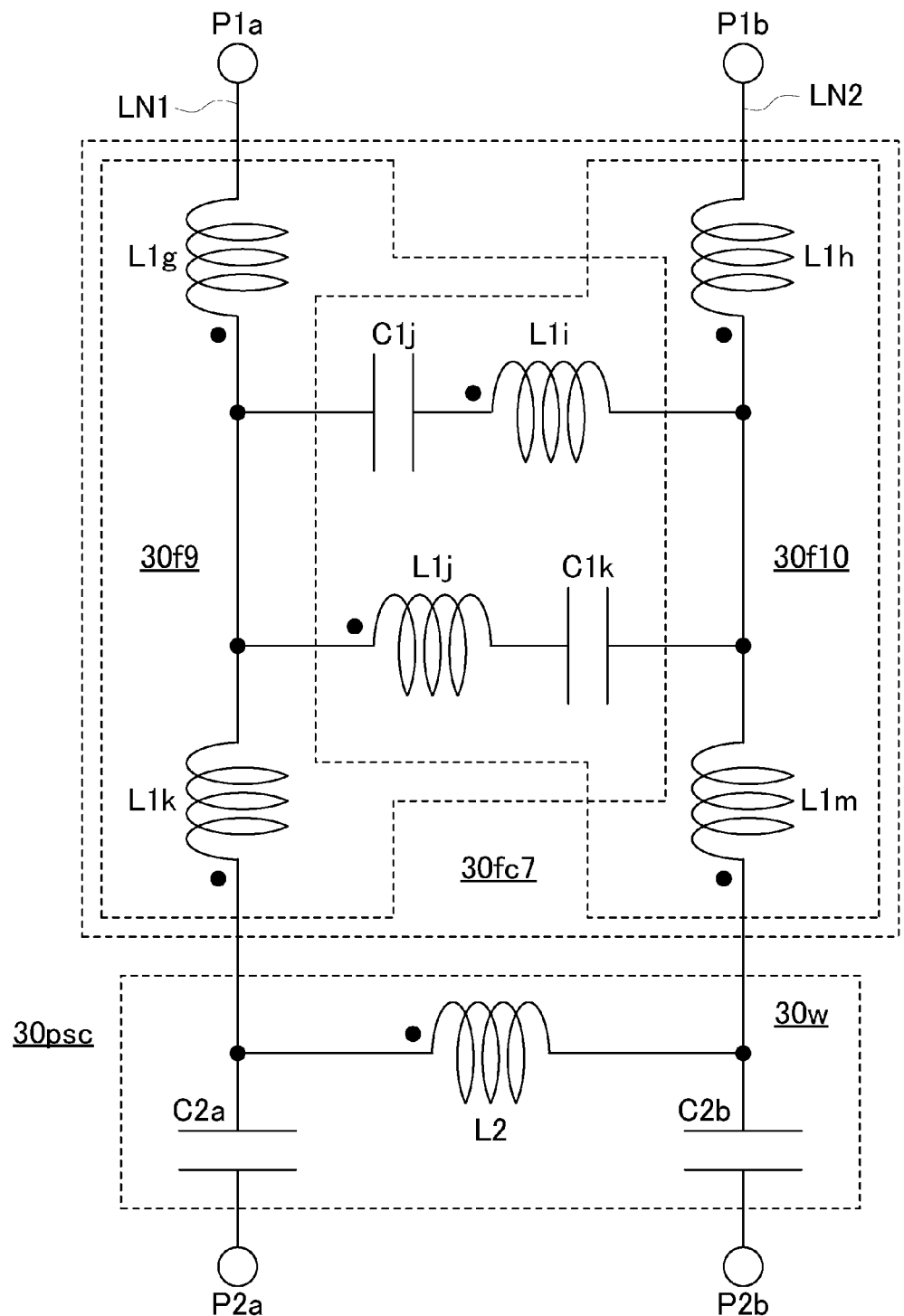
FIG. 22 is a circuit diagram representing an example of a power feeding circuit incorporated within the power feeding circuit substrate shown in FIG. 21.
Figure 25:
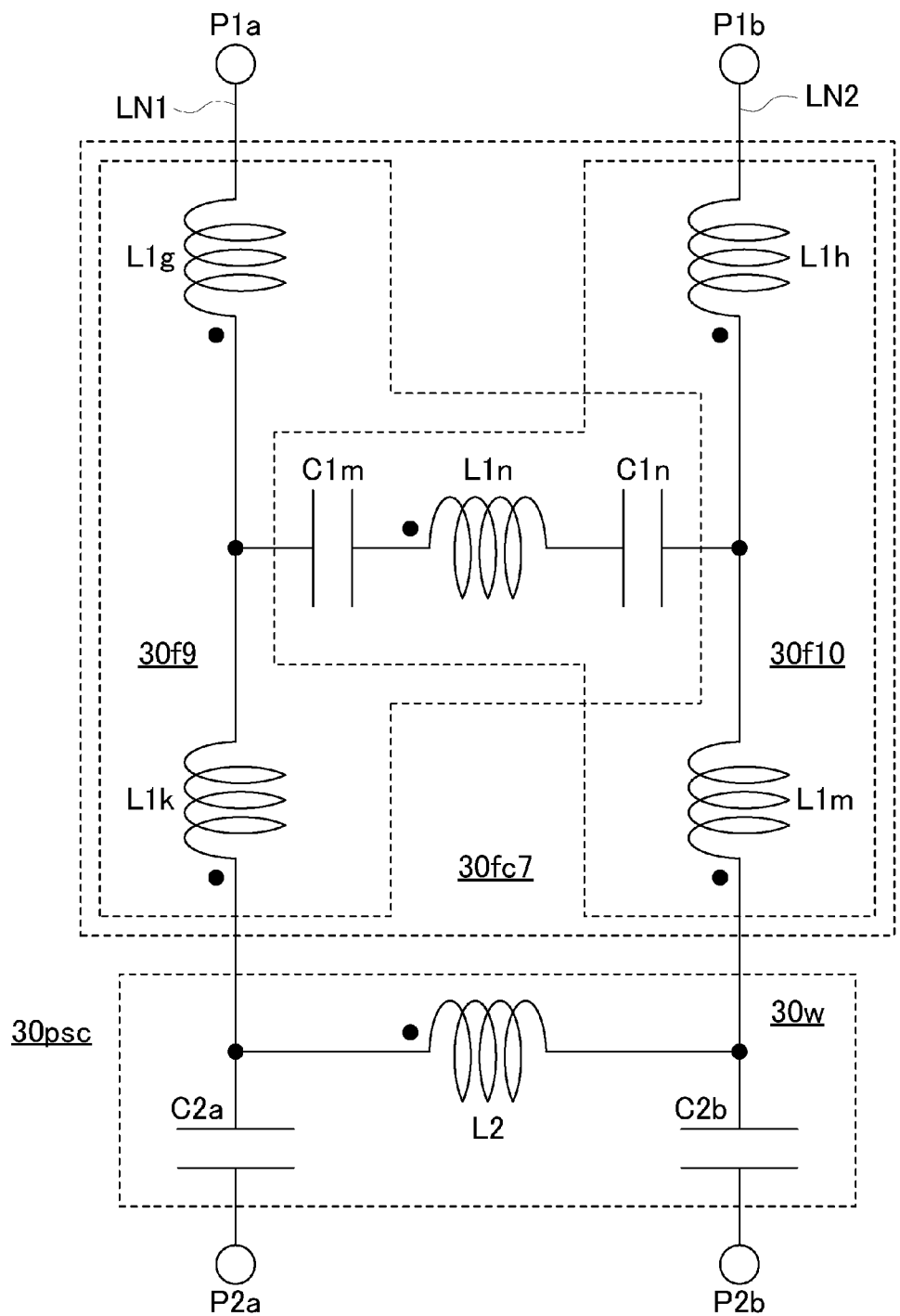
FIG. 25 is a circuit diagram representing a further example of a power feeding circuit incorporated within the power feeding circuit substrate shown in FIG. 21.

Filters 30f9 and 30f10 shown in FIG. 22 may be modified as shown in FIG. 25. Referring to FIG. 25, capacitors C1m and C1n and inductor L1n are provided instead of inductors L1i and L1j and capacitors C1j and C1k. Capacitor C1m includes one end connected to the node of inductors L1g and L1k, and the other end connected to one end of inductor L1n. The other end of inductor L1n is connected to one end of capacitor C1n, and the other end of capacitor C1n is connected to the node of inductors L1h and L1m.

Although the present invention has been described based on specific preferred embodiments, the present invention is not limited to the preferred embodiments set forth above. For example, although a mobile communication terminal device has been taken as an example of a communication device, the present invention is applicable to various types of radio communication devices such as a notebook type PC or tablet terminal.

The flat electrode (ground electrode) provided at the printed circuit board is not restricted to be provided within the printed circuit board, and may be provided on or at the surface of the printed circuit board. In this case, the mounting region of transmission and reception circuit element 28 is defined by a resist layer provided at the surface of the flat electrode. Moreover, the plane shape is not limited to rectangular or substantially rectangular, likewise with the plane shape of the main surface of the printed circuit board not being limited to rectangular or substantially rectangular.

The power feeding circuit substrate may be configured, not only as an interposer to mount radio IC chip 32*p* as set forth above, but also as a rewiring layer at the main surface of radio IC chip 32*cp*. Each of the preferred embodiments set forth above preferably includes the filter circuit including a conductor provided within the power feeding circuit substrate. In other words, the filter circuit has a so-called internal configuration. However, the filter circuit may be configured to include a discrete inductor and/or capacitor mounted on the substrate, or configured based on a combination of the internal configuration and component mounting.

Although loop electrode 16*lp* preferably includes a notch CT1 provided at flat electrode 16 and a portion of the flat electrode is used as a loop section, a loop electrode configured independent of flat electrode 16 may be electrically connected directly with flat electrode 16, or a loop electrode configured independent of flat electrode 16 may be coupled with flat electrode 16 through an electromagnetic field.

Preferred embodiments of the present invention are also applicable to, in addition the combination of an UHF band RFID system and GSM 900/GSM 850 system, a combination of an RFID system and a mobile communication system such as DCS and CDMA, a combination of an RFID system and a near field communication system such as Bluetooth (registered trademark) or wireless LAN, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication device comprising:
   a first communication system configured to communicate using a first communication signal with a first frequency band as a carrier frequency, and including a first radio communication integrated circuit configured to process the first communication signal; and
   a second communication system configured to communicate using a second communication signal with a second frequency band as a carrier frequency, and including a second radio communication integrated circuit configured to process the second communication signal; wherein
   the first communication system further includes a filter circuit with the first frequency band and at least a portion of the second frequency band as a pass band, and configured to attenuate a harmonic wave component of the second communication signal.

2. The communication device according to claim 1, wherein
   the first communication system further includes a first radiator connected to the first radio communication integrated circuit and configured to radiate the first communication signal; and
   the second communication system further includes a second radiator connected to the second radio communication integrated circuit and configured to radiate the second communication signal.

3. The communication device according to claim 2, wherein the first radiator is a ground electrode provided in a device frame.

4. The communication device according to claim 3, wherein the second communication system is electrically connected to the ground electrode.

5. The communication device according to claim 4, wherein
   the first communication system and the second communication system are connected with a common ground electrode at different feeding points;
   the filter circuit is provided between a feeding point of the ground electrode and the first radio communication integrated circuit.

6. The communication device according to claim 2, wherein the first radio communication integrated circuit and the first radiator are connected by two signal lines parallel to each other.

7. The communication device according to claim 6, wherein the filter circuit includes two filter elements assigned to the two signal lines, respectively.

8. The communication device according to claim 6, wherein the two signal lines are equivalent to a differential path, and the filter circuit is equivalent to a balanced filter circuit.

9. The communication device according to claim 6, wherein the filter circuit includes an inductor and a capacitor connected in series between the two signal lines.

10. The communication device according to claim 1, wherein the first communication system further includes a band broadening circuit configured to broaden a pass band width of the filter circuit.

11. The communication device according to claim 1, wherein
    the first communication system further includes a substrate on which the first radio communication integrated circuit is mounted;
    the substrate includes a stack of a plurality of base layers and a plurality of conductor layers; and
    the filter circuit is defined by the conductor layers, and is incorporated within the substrate.

12. The communication device according to claim 1, wherein
    the first communication system is an RFID system using a 900 MHz band as the first frequency band; and
    the second communication system is a GSM system using an 850 MHz band or 900 MHz band as the second frequency band.

13. A radio communication device used for the communication device defined in claim 1, comprising:
    the first radio communication integrated circuit; and
    a substrate including the first radio communication integrated circuit mounted thereon, and incorporating the filter circuit therein.

* * * * *